US011573687B2

(12) United States Patent
Lei et al.

(10) Patent No.: US 11,573,687 B2
(45) Date of Patent: Feb. 7, 2023

(54) SCREENSHOT METHOD AND APPARATUS FOR INFORMATION INTERACTION INTERFACE, COMPUTING DEVICE AND STORAGE MEDIUM

(71) Applicant: BOE TECHNOLOGY GROUP CO., LTD., Beijing (CN)

(72) Inventors: Liping Lei, Beijing (CN); Changcheng Liu, Beijing (CN); Wenchu Dong, Beijing (CN); Lirong Xu, Beijing (CN); Honglei Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/452,947

(22) Filed: Oct. 29, 2021

(65) Prior Publication Data

US 2022/0276768 A1 Sep. 1, 2022

(30) Foreign Application Priority Data

Feb. 26, 2021 (CN) .......................... 202110215577.4

(51) Int. Cl.
*G06F 3/04845* (2022.01)
*G06F 40/169* (2020.01)

(52) U.S. Cl.
CPC ........ *G06F 3/04845* (2013.01); *G06F 40/169* (2020.01)

(58) Field of Classification Search
CPC ........................... G06F 3/04845; G06F 40/169
See application file for complete search history.

(56) References Cited

U.S. PATENT DOCUMENTS

| 10,482,284 B1* | 11/2019 | Tang ................... G06V 20/635 |
| 2015/0332439 A1* | 11/2015 | Zhang ................... G06V 20/52 345/647 |
| 2017/0003862 A1* | 1/2017 | Mital .................. G06F 3/04842 |
| 2017/0004331 A1* | 1/2017 | Weldon ................... G06T 11/60 |
| 2017/0017366 A1* | 1/2017 | Cho ......................... G06T 11/00 |
| 2017/0068829 A1* | 3/2017 | Shaw ...................... G06F 21/50 |

(Continued)

FOREIGN PATENT DOCUMENTS

EP 3944063 A1 * 1/2022 ......... G06F 3/04842

*Primary Examiner* — Daniel Samwel
(74) *Attorney, Agent, or Firm* — Womble Bond Dickinson (US) LLP

(57) ABSTRACT

The present disclosure provides a screenshot method for an information interaction interface, including: detecting a screenshot operation; acquiring information corresponding to the information interaction interface in response to the screenshot operation, wherein the information corresponding to the information interaction interface includes at least one piece of display information currently displayed in the information interaction interface; displaying an editing interface including at least one piece of editable information, wherein each piece of editable information corresponds to one piece of display information; and editing display content of the editing interface in response to an operation on the editing interface to generate a final display picture including at least the edited display content. In addition, the present disclosure also provides a screenshot apparatus for an information interaction interface, a computing device, and a computer-readable storage medium.

17 Claims, 18 Drawing Sheets

(56) References Cited

U.S. PATENT DOCUMENTS

| | | | | |
|---|---|---|---|---|
| 2017/0132742 | A1* | 5/2017 | Deluca | G06T 11/60 |
| 2017/0277403 | A1* | 9/2017 | Huang | G06F 3/04845 |
| 2017/0371844 | A1* | 12/2017 | Yao | G06F 3/04883 |
| 2019/0278453 | A1* | 9/2019 | Sun | G06F 3/04845 |
| 2020/0293685 | A1* | 9/2020 | Levay | G06F 16/258 |

* cited by examiner

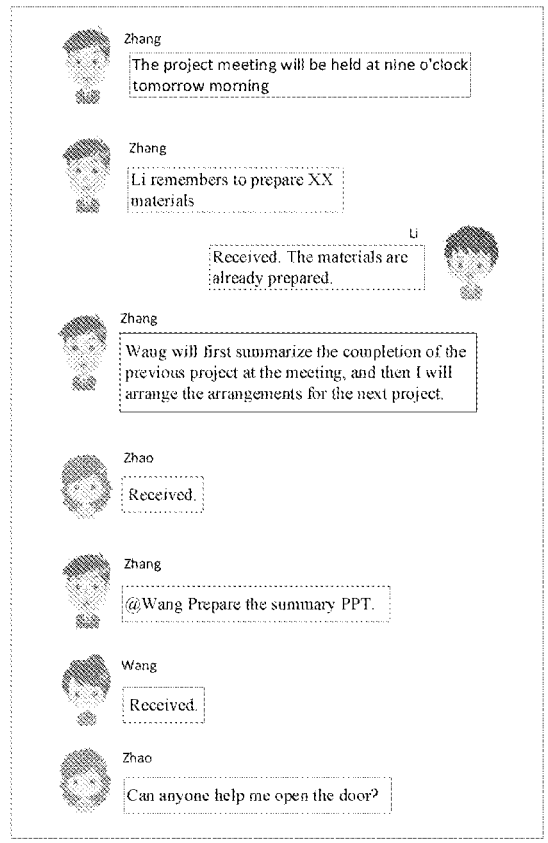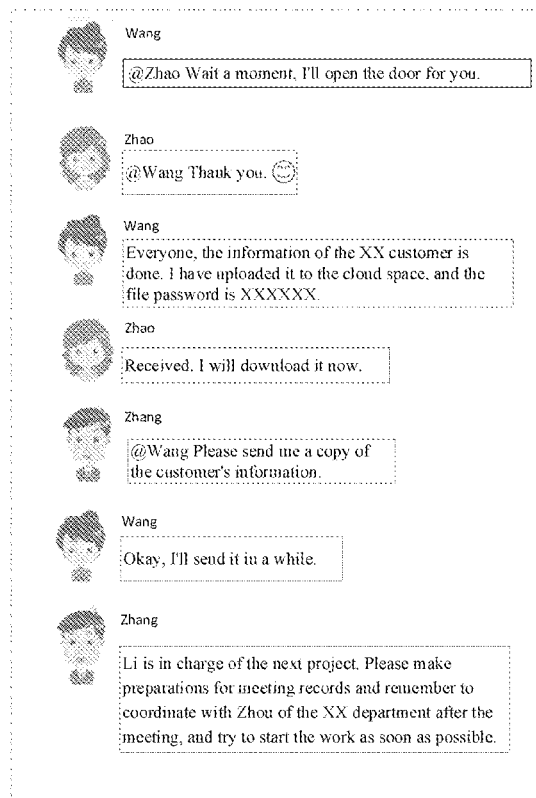
FIG. 4

Zhang
The project meeting will be held at nine o'clock tomorrow morning
Zhang
Wang will first summarize the completion of the previous project at the meeting, and then I will arrange the arrangements for the next project.
FIG. 7

Zhang
The project meeting will be held at nine o'clock tomorrow morning
Zhang
Wang will first summarize the completion of the previous project at the meeting, and then I will arrange the arrangements for the next project.
FIG. 12

Zhang

The project meeting will be held at nine o'clock tomorrow morning

Zhang

Wang will first summarize the completion of the previous project at the meeting, and then I will arrange the arrangements for the next project.

Zhang

Li is in charge of the next project. Please make preparations for meeting records and remember to coordinate with Zhou of the XX department after the meeting, and try to start the work as soon as possible.

FIG. 15

Zhang

The project meeting will be held at nine o'clock tomorrow morning

※※※※※※※※※※※※※※※※※※※※※

Zhang

Wang will first summarize the completion of the previous project at the meeting, and then I will arrange the arrangements for the next project.

※※※※※※※※※※※※※※※※※※※※

Zhang

Li is in charge of the next project. Please make preparations for meeting records and remember to coordinate with Zhou of the XX department after the meeting, and try to start the work as soon as possible.

FIG. 17

SCREENSHOT METHOD AND APPARATUS FOR INFORMATION INTERACTION INTERFACE, COMPUTING DEVICE AND STORAGE MEDIUM

CROSS REFERENCE TO RELATED APPLICATIONS

The present application claims priority to Chinese patent application No. 202110215577.4 titled "Method and Device for Intercepting Dialogue Interface, Computer Device and Storage Medium" filed on Feb. 26, 2021, the entire content of which is incorporated by reference into the present disclosure.

TECHNICAL FIELD

The present disclosure relates to the field of computer technology, and in particular, to a screenshot method and apparatus for an information interaction interface, a computing device, and a computer-readable storage medium.

BACKGROUND

With the continuous development of electronic technology, a terminal device has more and more functions. When running social applications such as WeChat and QQ, users often take screenshots of information interaction interfaces, such as dialogue interfaces, to share information, such as dialogue information. This method is relatively convenient and quick to operate, so it has been widely used. However, when taking a screenshot of the dialogue interface, the screenshot picture will include all the dialogue content in the current dialogue interface. Therefore, on the one hand, the valuable dialogue information to be shared is often discontinuous, especially for a group chat dialogue interface, which often includes irrelevant dialogue information, worthless dialogue information, and information that cannot be seen by others, so it is inevitable that there will be interference or leakage of information. On the other hand, the valuable dialogue information to be shared often cannot appear in one dialogue interface, which makes it necessary to take screenshots twice or more times, resulting in a decrease in the efficiency and convenience of operations.

Currently, there are two main ways to remove dialogue information from the screenshot pictures of the dialogue interface of social applications: the first way is to take a screenshot of the dialogue interface first, and then edit the screenshot picture through an image editing software to delete or smear some dialogue information in the screenshot picture; the second way is to delete some dialogue information in the dialogue record first, and then take a screenshot. However, the above two ways have their own problems: the problem of the first way is mainly that it requires the help of an image editing software, such that the operation efficiency and convenience are not high, and the integration of valuable dialogue information cannot be achieved; the main problem of the second way is that it may cause the original dialogue record in the social application to be lost.

SUMMARY

According to a first aspect of the present disclosure, a screenshot method for an information interaction interface is provided. The screenshot method includes the following steps: detecting a screenshot operation; acquiring information corresponding to the information interaction interface in response to the screenshot operation, wherein the information corresponding to the information interaction interface includes at least one piece of display information currently displayed in the information interaction interface; displaying an editing interface including at least one piece of editable information, wherein each piece of editable information corresponds to one piece of display information; editing display content of the editing interface in response to an operation on the editing interface to generate a final display picture including at least edited display content.

In some exemplary embodiments, a display format of the at least one piece of editable information in the editing interface is the same as a display format of the at least one piece of display information in the information interaction interface.

In some exemplary embodiments, the step of displaying an editing interface including at least one piece of editable information further includes: displaying at least one information deletion control in the editing interface, wherein each information deletion control corresponds to a piece of editable information.

In some exemplary embodiments, the step of editing display content of the editing interface in response to an operation on the editing interface to generate a final display picture including at least edited display content further includes: deleting the piece of editable information corresponding to the information deletion control from the editing interface in response to an operation on the information deletion control.

In some exemplary embodiments, each piece of information in the information corresponding to the information interaction interface further includes a user identification, and each piece of editable information also includes a corresponding user identification.

In some exemplary embodiments, the step of displaying an editing interface including at least one piece of editable information further includes: displaying in the editing interface a user identification deletion control corresponding to the user identification of the at least one piece of editable information respectively.

In some exemplary embodiments, the step of editing display content of the editing interface in response to an operation on the editing interface to generate a final display picture including at least edited display content further includes: deleting all pieces of editable information having the user identification corresponding to the user identification deletion control from the editing interface in response to an operation on the user identification deletion control.

In some exemplary embodiments, the information corresponding to the information interaction interface further includes undisplayed information that is not currently displayed in the information interaction interface.

In some exemplary embodiments, the step of editing display content of the editing interface in response to an operation on the editing interface to generate a final display picture including at least edited display content further includes: when deleting the editable information from the editing interface, using the undisplayed information to fill a blank area in the editing interface formed by deleting the editable information.

In some exemplary embodiments, the step of editing display content of the editing interface in response to an operation on the editing interface to generate a final display picture including at least edited display content further includes: when deleting the editable information from the editing interface, adding a deletion indicator at a position where the editable information is deleted.

In some exemplary embodiments, the step of displaying an editing interface including at least one piece of editable information further includes: displaying at least one annotation addition control in the editing interface, wherein each annotation addition control corresponds to a piece of editable information.

In some exemplary embodiments, the step of editing display content of the editing interface in response to an operation on the editing interface to generate a final display picture including at least edited display content further includes: adding an annotation to the editable information corresponding to the annotation addition control in the editing interface in response to an operation on the annotation addition control.

In some exemplary embodiments, the step of displaying an editing interface including at least one piece of editable information further includes: displaying at least one display parameter modification control in the editing interface, wherein each display parameter modification control corresponds to a piece of editable information.

In some exemplary embodiments, the step of editing display content of the editing interface in response to an operation on the editing interface to generate a final display picture including at least edited display content further includes: modifying a display parameter of the editable information corresponding to the display parameter modification control in the editing interface in response to an operation on the display parameter modification control to change display effect of the editable information in the editing interface.

In some exemplary embodiments, the step of acquiring information corresponding to the information interaction interface in response to the screenshot operation further includes: acquiring a screenshot picture in response to the screenshot operation; recognizing at least one piece of display information currently displayed in the information interaction interface from the screenshot picture.

In some exemplary embodiments, the step of acquiring information corresponding to the information interaction interface in response to the screenshot operation further includes: acquiring an extended screenshot picture in response to the screenshot operation and a scrolling screenshot operation associated with the screenshot operation; recognizing at least one piece of display information currently displayed in the information interaction interface and undisplayed information not currently displayed in the information interaction interface from the extended screenshot picture.

In some exemplary embodiments, the step of acquiring information corresponding to the information interaction interface in response to the screenshot operation further includes: in response to the screenshot operation, acquiring at least one piece of display information currently displayed in the information interaction interface and undisplayed information not currently displayed in the information interaction interface from application data of an application program using the information interaction interface.

According to a second aspect of the present disclosure, a screenshot apparatus for an information interaction interface is provided. The screenshot apparatus includes: a detection module configured to detect a screenshot operation; an acquisition module configured to acquire information corresponding to the information interaction interface in response to the screenshot operation, wherein the information corresponding to the information interaction interface includes at least one piece of display information currently displayed in the information interaction interface; a display module configured to display an editing interface including at least one piece of editable information, wherein each piece of editable information corresponds to one piece of display information; an editing and generating screenshot module configured to edit display content of the editing interface in response to an operation on the editing interface to generate a final display picture including at least edited display content.

According to a third aspect of the present disclosure, a computing device is provided. The computing device includes a processor and a memory, the memory being configured to store computer-executable instructions, the computer-executable instructions being configured to, when executed on the processor, make the processor perform the screenshot method for an information interaction interface according to any one of the above-mentioned exemplary embodiments.

According to a fourth aspect of the present disclosure, a computer-readable storage medium is provided. The computer-readable storage medium is configured to store computer-executable instructions, the computer-executable instructions being configured to, when executed on a processor, make the processor perform the the screenshot method for an information interaction interface according to any one of the above-mentioned exemplary embodiments.

The technical solution based on the present disclosure effectively improves the efficiency and convenience of taking screenshots of an information interaction interface, such as a dialogue interface of a social application, for information sharing, thereby greatly improving the user experience.

BRIEF DESCRIPTION OF DRAWINGS

The specific embodiments of the present disclosure are described in further detail below in conjunction with the drawings, so that more details, features, and advantages of the present disclosure can be fully appreciated and understood. In the drawings:

FIG. 4 is a schematic diagram showing an extended screenshot picture obtained by taking a scrolling screenshot of the current dialogue interface shown in FIG. 2;

FIG. 7 is a schematic diagram showing a final display picture generated based on the editing interface shown in FIG. 6;

FIG. 12 is a schematic diagram showing a final display picture generated based on the editing interface shown in FIG. 11;

FIG. 15 is a schematic diagram showing a final display picture generated based on the editing interface shown in FIG. 14;

FIG. 17 is a schematic diagram showing a final display picture generated based on the editing interface shown in FIG. 16;

Figure 1:
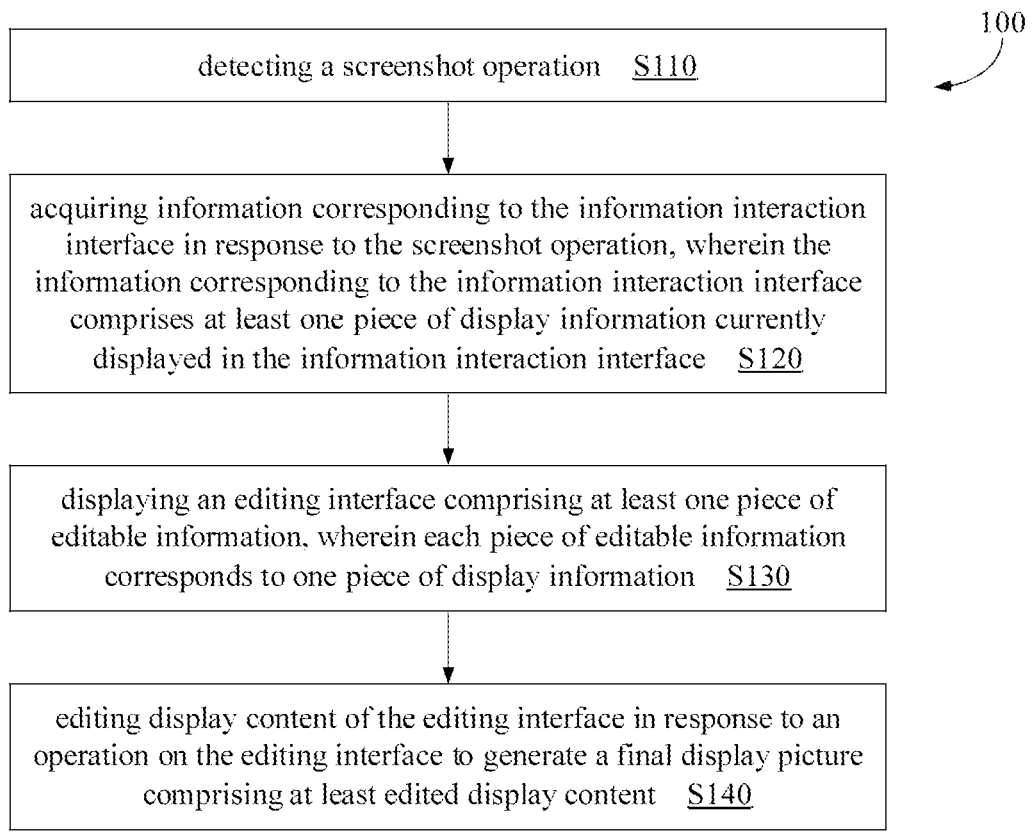
FIG. 1 shows in the form of a flowchart a screenshot method for an information interaction interface provided according to an exemplary embodiment of the present disclosure.

It should be understood that the contents shown in the drawings are only schematic, and therefore they are not necessarily drawn to scale. In addition, throughout all the drawings, the same or similar features are indicated by the same or similar reference signs.

DETAILED DESCRIPTION OF EMBODIMENTS

In order to describe the present disclosure more clearly, the present disclosure will be further described below in conjunction with specific embodiments and drawings. It should be understood that the content described in detail below is illustrative rather than restrictive, and therefore does not constitute any limitation to the protection scope of the present disclosure.

The screenshot method for an information interaction interface provided according to an exemplary embodiment of the present disclosure can implement an editable screenshot of the information interaction interface. It should be understood that, in the present disclosure, the information interaction interface may be the user interface of any suitable information interaction application program, such as, but not limited to, the dialogue interface of social applications, the editing interface of webpage forms, the information interaction interface of games, and the like. Therefore, the screenshot method for an information interaction interface according to the present disclosure can be applied to a terminal device having a display screen and running an information interaction application, such as the above-mentioned various applications. As a non-limiting example, the terminal device may be a personal computer such as a desktop computer or a notebook computer, or the terminal device may also be a mobile terminal device such as a smart phone, a tablet computer, an e-book reader, an MP3 player, an MP player and the like, or the terminal device may also be a wearable smart device such as a smart watch or smart glasses. The screenshot method for an information interaction interface according to the present disclosure can be implemented in a terminal device in the form of a screenshot tool. For example, the screenshot tool can be independently implemented as a third party application program, or it can be implemented as an information interaction application, such as a plug-in or component in social applications such as WeChat and QQ and the like, or, it can also be implemented as a system tool included in the operating system itself in the terminal device.

Referring to FIG. 1, it shows in the form of a flowchart a screenshot method for an information interaction interface provided according to an exemplary embodiment of the present disclosure. It should be understood that in the following, in conjunction with FIGS. 1 to 17, a screenshot method applied to a smart phone with a touch screen and running a social application is taken as an exemplary embodiment to describe the screenshot method according to the present disclosure. Therefore, in the examples shown in FIGS. 2 to 17, the information interaction interface in the screenshot method shown in FIG. 1 refers to the dialogue interface of the social application shown, and the information corresponding to the information interaction interface refers to the dialogue information included in the dialogue interface shown. In other words, in the following exemplary description with reference to FIGS. 1 to 17, the information interaction interface and the dialogue interface are equivalent, and therefore can be used interchangeably, and the information corresponding to the information interaction interface and the dialogue information of the dialogue interface are also equivalent, and therefore can also be used interchangeably.

In addition, it should also be understood that the screenshot method for an information interaction interface according to the present disclosure is not limited to being used for a dialogue interface of a social application, but can be used for a user interface of any suitable information interaction application programs. As mentioned above, for example, the screenshot method can also be used in the editing interface of webpage forms, the information interaction interface of games, and the like. In these situations, the information interaction interface may be a corresponding editing interface or an interaction interface, and the information corresponding to the information interaction interface is correspondingly various pieces of information in a webpage form or various pieces of information in an information interaction interface of a game.

As shown in FIG. 1, the screenshot method 100 for an information interaction interface can include the following steps:

Step S110: detecting an screenshot operation.

As a non-limiting example, the screenshot operation in this exemplary embodiment may directly use the existing screenshot operation method in the smart phone, such as "unlock key+volume down key" or "the user pulls down the notification bar and clicks on the screenshot control displayed on the switch interface", and then the screenshot operation can be detected through the smartphone's processor or touch screen.

In addition, the screenshot operation in this exemplary embodiment may also be a separately set editable screenshot operation mode, for example, it may be "unlock key+volume up key", or may be an editable screenshot control displayed on the interface. In this way, the user can conveniently select a normal screenshot or an editable screenshot according to requirements, thereby avoiding the problem such as possible waste of computing resources when the editable screenshot is not required. In addition, the screenshot operation in this exemplary embodiment may also be implemented based on a dialogue interface screenshot control displayed in a social application such as WeChat and the like, so that the screenshot operation can be performed only on the dialogue interface.

Figure 2:
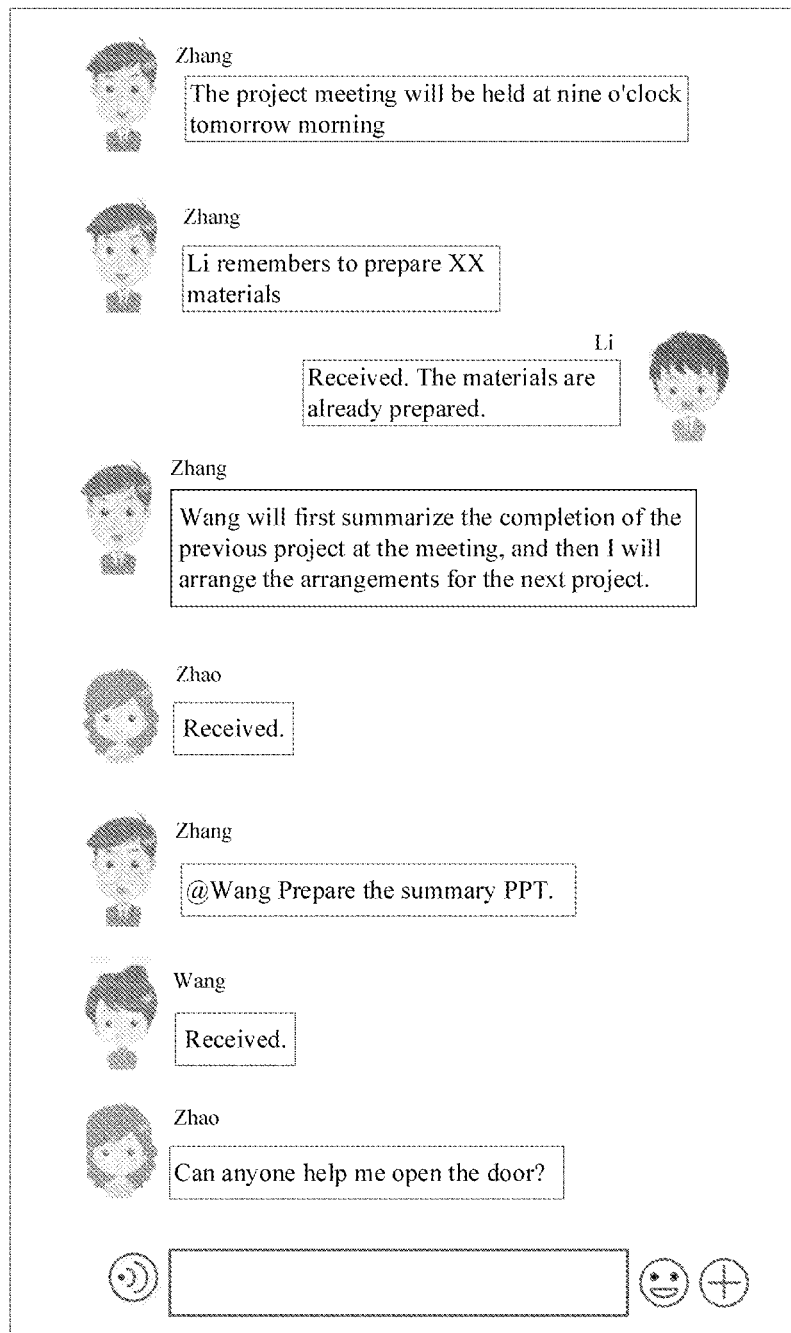
FIG. 2 is a schematic diagram showing the current dialogue interface.

In a specific example, the current dialogue interface, that is, the currently displayed dialogue interface, is as shown in FIG. 2. Regarding the dialogue interfaces schematically shown in the drawings of the present disclosure, it should be noted that: (1) the input field at the bottom of the dialogue interface is of little value to the dialogue information shared, therefore, in the schematic diagram of the dialogue interface and the schematic diagrams of the subsequent dialogue interfaces, the input field is omitted; (2) the dialogue interface usually also includes time information above each dialogue item to show the time when the dialogue information was sent, and the time information is omitted in FIG. 2 and the schematic diagrams of the subsequent dialogue interfaces; (3) the dialogue interface of social applications is usually in a non-full screen mode, and generally speaking, the entire display page should also include the status bar displayed above containing time information, battery information, and cell phone signal information, these are all omitted in FIG. 2 and the schematic diagrams of the subsequent dialogue interfaces.

In this specific example, the current dialogue interface shown in FIG. 2 is a dialogue interface of a departmental group chat of a certain company in the social application. As shown in FIG. 2, among the 8 dialogue items displayed in the dialogue interface, some items are the dialogue information related to a meeting (for example, items 1-7 in chronological order, that is, in the display direction from top to bottom), the other item(s) (for example, item 8) has nothing to do with the meeting. In addition, some of the dialogue information related to the meeting is worthless information for the information that the user wants to share (for example, items 2, 3, 5-7). Therefore, when the user Li in the group chat wants to share the dialogue information contained in, for example, dialogue items 1 and 4 with the colleague(s) in another department who is(are) not in the group chat, Li can share the information by means of screenshots. However, if the information is shared based on the existing screenshot method, it will carry worthless information such as item 8. Therefore, the editable screenshot method provided according to the exemplary embodiment of the present disclosure can be applied to this scenario. There are many scenarios similar to the above, the present disclosure will not give examples one by one, and the detailed description below only uses the above scenario as an example.

In some alternative implementations, the dialogue information includes user identification and dialogue content.

As a non-limiting example, in the current dialogue interface as shown in FIG. 2, the user identification includes a user avatar image and a user name such as "Zhang". Of course, the user identification may also include only the user avatar image or only the user name, which may be determined according to the settings of the social application, which is not limited in the present disclosure. In addition, the dialogue content may include text content and/or picture content. The text content may include the text sent by the user, the text obtained by converting the voice sent by the user, and the like. The picture content may include the picture sent by the user, the video icon with the video playback icon in the picture format, the emoticon in the picture format, voice icon in the picture format, and the like. In addition, since the screenshot picture cannot share the specific playback content of the video and voice, for the video, voice, and the like in the dialogue interface, only their icons in the picture format may be shown in the dialogue information.

In some optional implementations, step S120 may further include:

acquiring a screenshot picture in response to the screenshot operation.

recognizing at least one piece of display information currently displayed in the information interaction interface from the screenshot picture.

It should be noted that the screenshot picture includes at least the currently displayed dialogue interface. The expression "includes at least" means that, on the one hand, it includes the currently displayed dialogue interface, and on the other hand, it may also include a status bar and the like. It should also be noted that, in this exemplary embodiment, although the screenshot picture is acquired in response to the screenshot operation, the screenshot picture is not displayed to the user, but is used to recognize at least one piece of display information displayed in the information interaction interface, for example, the dialogue information displayed in the current dialogue interface.

Through this implementation, the dialogue information displayed in the current dialogue interface can be acquired accurately, efficiently, and conveniently.

As a non-limiting example, the dialogue information in the screenshot picture can be recognized based on the optical character recognition (OCR) technology, so as to obtain the dialogue information including the user identification and the dialogue content displayed in the current dialogue interface.

Figure 3:
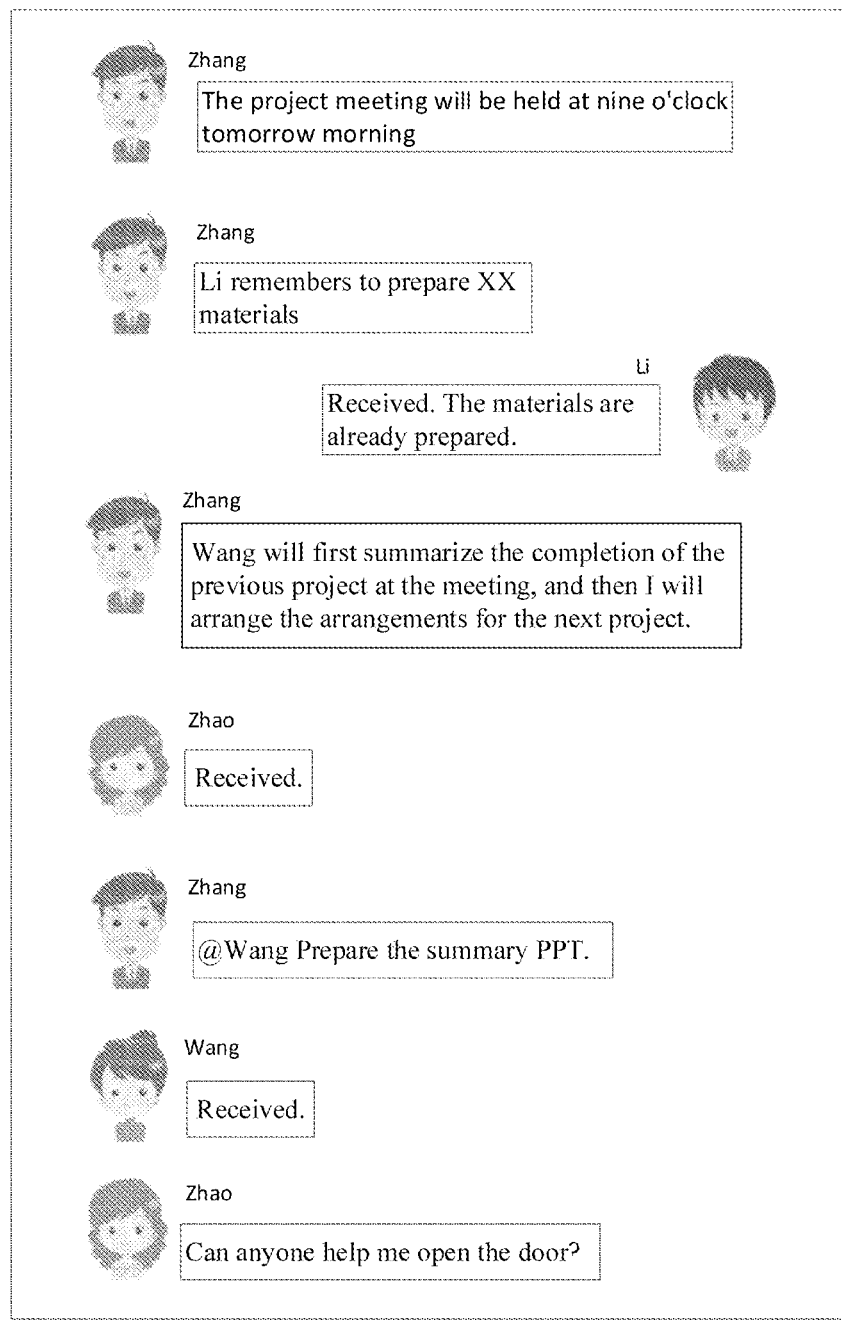
FIG. 3 is a schematic diagram showing a screenshot picture obtained by taking a screenshot of the current dialogue interface shown in FIG. 2.

As a non-limiting example, the screenshot picture obtained after taking a screenshot of the current dialogue interface shown in FIG. 2 may be as shown in FIG. 3.

In some optional exemplary implementations, the information corresponding to the information interaction interface may also include undisplayed information that is not currently displayed in the information interaction interface. For example, the dialogue information corresponding to the current dialogue interface may also include dialogue information located after the dialogue information displayed in the current dialogue interface in chronological order. The dialogue information located after the dialogue information displayed in the current dialogue interface in chronological order is the subsequent dialogue information that belongs to the dialogue information corresponding to the current dialogue interface but is not displayed in the currently displayed dialogue interface.

In this implementation, the acquired dialogue information corresponding to the current dialogue interface not only includes the dialogue information displayed in the current dialogue interface, but also includes the dialogue information that is located after the dialogue information displayed in the current dialogue interface in, for example, chronological order, that is, it also includes subsequent dialogue information that is not completely displayed in the current dialogue interface. Therefore, this implementation is helpful to integrate valuable information that cannot be originally presented in a screenshot picture into a screenshot picture after the editing of deleting the dialogue information. In other words, this implementation can present more valuable information with fewer screenshots. Therefore, this implementation is more conducive to integrating valuable dialogue information to be shared in the screenshot picture, and it is also more convenient for the person being shared to quickly and accurately obtain the information to be notified.

In some optional implementations, step S120 may further include:

acquiring an extended screenshot picture in response to the screenshot operation and a scrolling screenshot operation associated with the screenshot operation;

recognizing at least one piece of display information currently displayed in the information interaction interface and undisplayed information not currently displayed in the information interaction interface from the extended screenshot picture.

That is, in the above steps, in response to the screenshot operation and the scrolling screenshot operation associated therewith, the scrolling screenshot is performed to obtain the extended screenshot picture including at least the currently displayed dialogue interface and the subsequent dialogue interface that is not currently displayed. Then, by recognizing the dialogue information in the extended screenshot picture, the dialogue information displayed in the current dialogue interface and the dialogue information after the dialogue information displayed in the current dialogue interface can be obtained.

It should be noted that the extended screenshot picture obtained in response to the screenshot operation and the scrolling screenshot operation associated therewith includes at least the currently displayed dialogue interface and the subsequent dialogue interface that is not currently displayed. In addition, it may also include a status bar and the like. It should also be noted that, in this exemplary implementation, although the extended screenshot picture is acquired in response to the screenshot operation and the scrolling screenshot operation associated therewith, the extended screenshot picture is not displayed to the user, but is used to recognize the dialogue information displayed in the current dialogue interface and the subsequent dialogue information.

As a non-limiting example, the screenshot operation and the scrolling screenshot operation associated therewith may include: first, use the "unlock key+volume down key" to trigger the screenshot function, so that the smartphone will take a screenshot of the current dialogue interface and display the screenshot picture and the scrolling screenshot control; then, click the scrolling screenshot control to trigger the scrolling screenshot function, so that the smartphone automatically scrolls the dialogue item window of the dialogue interface to the subsequent dialogue items and take a screenshot of the subsequent dialogue items; finally, the smartphone combines the screenshot pictures obtained from a plurality of screenshots, so as to obtain at least the extended screenshot picture including at least the currently displayed dialogue interface and the subsequent dialogue interface that is not currently displayed.

Through this implementation, not only the dialogue information displayed in the current dialogue interface can be obtained accurately, efficiently and conveniently, but also the dialogue information located after the dialogue information displayed in the current dialogue interface can be obtained accurately, efficiently and conveniently. That is, the subsequent dialogue information that cannot be completely displayed in the current dialogue interface is obtained. Therefore, this implementation is helpful to integrate valuable information that cannot be originally presented in a screenshot picture into a screenshot picture after the editing of deleting the dialogue information. As a result, this implementation can present more valuable information with fewer screenshots. Therefore, this implementation is more conducive to integrating valuable dialogue information to be shared in the screenshot picture, and it is also more convenient for the person being shared to quickly and accurately obtain the information to be notified.

As a non-limiting example, an extended screenshot picture obtained after taking a scrolling screenshot on the current dialogue interface shown in FIG. 2 is shown in FIG. 4. In FIG. 4, the solid line dialogue item box at the top shows the currently displayed dialogue interface, and the dashed line dialogue item box at the bottom shows the subsequent dialogue interface that is not currently displayed (that is, the subsequent dialogue interface of the currently displayed dialogue interface, or the subsequent dialogue interface of the current dialogue interface). In addition, it should be noted that the actual scrolling screenshot picture usually only has an overall solid line dialogue item box, and the scrolling screenshot picture is displayed on the full screen with a reduced picture size. However, in FIG. 4, in order to facilitate the distinction, the currently displayed dialogue interface and the subsequent dialogue interface that is not currently displayed are displayed in the original size, and the solid line dialogue item box and the dashed line dialogue item box are used to respectively show the current dialogue interface and the subsequent dialogue interface that is not currently displayed.

In some optional implementations, step S120 may further include:

in response to the screenshot operation, acquiring at least one piece of display information currently displayed in the information interaction interface and undisplayed information not currently displayed in the information interaction interface from application data of an application program using the information interaction interface.

It should be understood that the expression "at least one piece of display information currently displayed in the information interaction interface and undisplayed information not currently displayed in the information interaction interface" in the above step may be the dialogue information displayed in the current dialogue interface and the dialogue information located after the dialogue information displayed in the current dialogue interface, respectively. The information can be stored in the local application data of the social application. According to the dialogue to which the current dialogue interface of the social application belongs, query the local application data, for example, a dialogue record document, to obtain the above-mentioned dialogue information. For example, the determination of the dialogue to which the current dialogue interface of the social application belongs and the progress of the dialogue items displayed in the current dialogue interface in the dialogue record can be realized based on the current running data of the social application.

In an exemplary specific example, if the display format of the current dialogue interface shown in FIG. 2 is used to display the dialogue information displayed in the current dialogue interface shown in FIG. 2 and the dialogue information located after the dialogue information displayed in the current dialogue interface shown in FIG. 2, both of which are acquired from the application data of the social application, the display content can be as shown in FIG. 4.

This optional implementation directly acquires the dialogue information from the application data of the social application, and subsequently generates an editing interface based on the dialogue information acquired from the application data. Therefore, this implementation can not only acquire the dialogue information displayed in the current dialogue interface more accurately, efficiently and conveniently, but also acquire the dialogue information after the dialogue information displayed in the current dialogue interface more accurately, efficiently and conveniently. That is, the subsequent dialogue information that cannot be completely displayed in the current dialogue interface is obtained. Therefore, this implementation is helpful to integrate valuable information that cannot be originally presented in a screenshot picture into a screenshot picture after the editing of deleting the dialogue information. That is, this implementation can present more valuable information with fewer screenshots. Therefore, this implementation is more conducive to integrating valuable dialogue information to be shared in the screenshot picture, and it is also more convenient for the person being shared to quickly and accurately obtain the information to be notified.

As mentioned above, according to the exemplary embodiments of the present disclosure, there are provided three optional implementations for acquiring the dialogue information corresponding to the current dialogue interface, including the first acquisition manner (recognizing the dialogue information from the ordinary screenshot picture), and the second acquisition manner (recognizing the dialogue information from the extended screenshot picture) and the third acquisition manner (the manner of acquiring the dialogue information directly from the application data of the social application). The second acquisition manner (recognizing the dialogue information from the extended screenshot picture) and the third acquisition manner (the manner of acquiring the dialogue information directly from the application data of the social application) can both realize the acquisition of the dialogue information after the dialogue information displayed in the current dialogue interface, that is, the acquisition of subsequent dialogue information that is not completely displayed in the current dialogue interface, which is helpful to integrate valuable information that cannot be originally presented in a screenshot picture into a screenshot picture after the editing of deleting the dialogue information, that is, presenting more valuable information with fewer screenshots.

In addition, it is also possible to acquire only the dialogue information displayed in the current dialogue interface through the third acquisition manner (the manner of acquiring the dialogue information directly from the application data of the social application). That is, in response to the screenshot operation, the dialogue information displayed in the current dialogue interface is acquired from the application data of the social application. In an exemplary specific example, if the display format of the current dialogue interface shown in FIG. 2 is used to display the dialogue information displayed in the current dialogue interface shown in FIG. 2, which is acquired from the application data of the social application, the display content can be approximately as shown in FIG. 3.

Continuing to refer to FIG. 1, the screenshot method 100 for an information interaction interface may further include steps S130 and S140.

Step S130: displaying an editing interface comprising at least one piece of editable information, wherein each piece of editable information corresponds to one piece of display information.

Step S140: editing display content of the editing interface in response to an operation on the editing interface to generate a final display picture comprising at least edited display content.

The editing interface is used to directly edit the editable information, for example, delete, move, change the display effect (for example, zoom in, zoom out, change the color, and the like), add annotations, and the like, which is finally reflected in the picture displayed to the user. As a result, the user can easily remove irrelevant dialogue information from the screenshot picture, remain valuable dialogue information that they want to share, so as to avoid interference or leakage of irrelevant dialogue information, and facilitate the person being shared to quickly and accurately obtain the information to be notified.

In some optional implementation, step S130 may further include: displaying at least one information deletion control in the editing interface, wherein each information deletion control corresponds to a piece of editable information. Correspondingly, step 140 may further include: deleting the piece of editable information corresponding to the information deletion control from the editing interface in response to an operation on the information deletion control.

In the above steps, through the editing control such as the information deletion control, the dialogue information contained in the editing interface can be deleted and edited conveniently and quickly, and the editing result is finally reflected in the picture displayed to the user. In this way, the user can easily remove irrelevant dialogue information from the screenshot picture, remain valuable dialogue information that they want to share, so as to avoid interference or leakage of irrelevant dialogue information, and facilitate the person being shared to quickly and accurately obtain the information to be notified.

It should be noted that the expression "comprising at least" in the expression "a final display picture comprising at least edited display content" in step S140 means that, on the one hand, it may include the edited display content (mainly the reserved dialogue information), on the other hand, it may also include a status bar and the like.

In some optional implementations, the display format of the at least one piece of editable information in the editing interface is the same as the display format of the at least one piece of display information in the information interaction interface. That is, for the dialogue interface, the dialogue information included in the editing interface is displayed based on the display format of the current dialogue interface. This implementation improves the convenience for the user to perform a view and an operation by displaying, in the editing interface, the acquired dialogue information corresponding to the current dialogue interface in the same display format as the current dialogue interface.

As a non-limiting example, the editing interface can be included in a floating window displayed in the upper layer of the current dialogue interface. The size of the floating window is, for example, full-screen display, and the size and display format of the editing interface in the floating window are the same as those of the current dialogue interface.

In an exemplary specific example, step S120 adopts the first acquisition manner (recognizing the dialogue information from the ordinary screenshot picture), and the dialogue information displayed in the current dialogue interface is acquired by recognizing the screenshot picture shown in FIG. 3. In this case, the generated edit interface including the dialogue information displayed in the current dialogue interface displayed based on the display format of the current dialogue interface and the information deletion control corresponding to each piece of dialogue information is as shown in FIG. 5, wherein, the information deletion control is presented as a cross-shaped deletion control displayed adjacent to the user avatar image of each piece of dialogue information.

Figure 5:
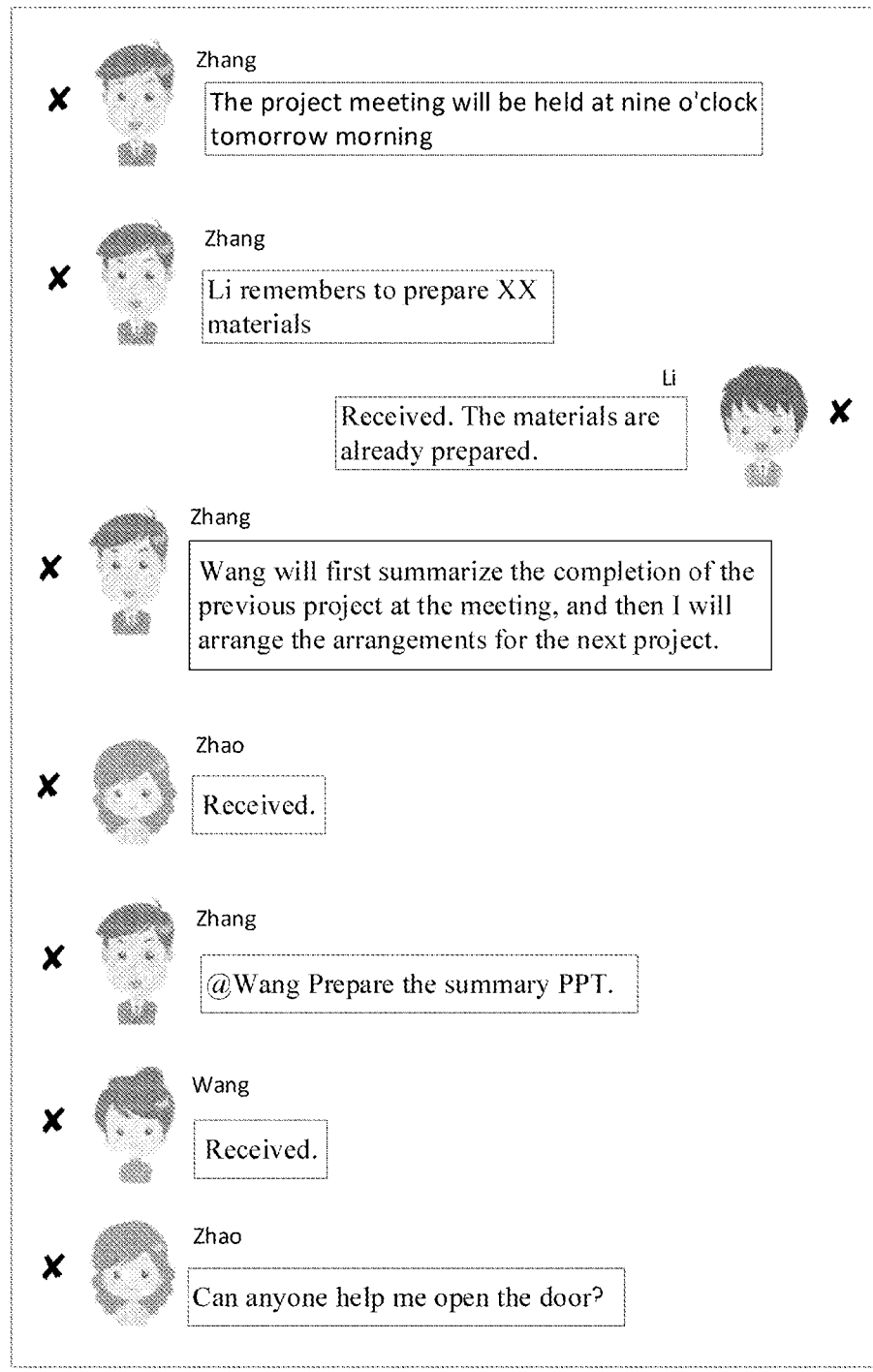
FIG. 5 schematically shows an editing interface obtained based on recognizing the screenshot picture shown in FIG. 3.

It should be noted that by comparing FIG. 5 and FIG. 3, it can be seen that the dialogue information included in the editing interface can be displayed based on the display format of the current dialogue interface, that is, the display format of the dialogue information displayed in the editing interface is the same as the dialogue format of the dialogue items displayed in the current dialogue interface. For example, the dialogue text has the same font, text color, size, and word spacing, the user name text has the same font, text color, size, and word spacing, the user avatar image has the same size, and the spacing between adjacent dialogue items is the same, and so on. In addition, the editing interface and the current dialogue interface can also be set to the same display format in the background color and margins on both sides.

Figure 6:
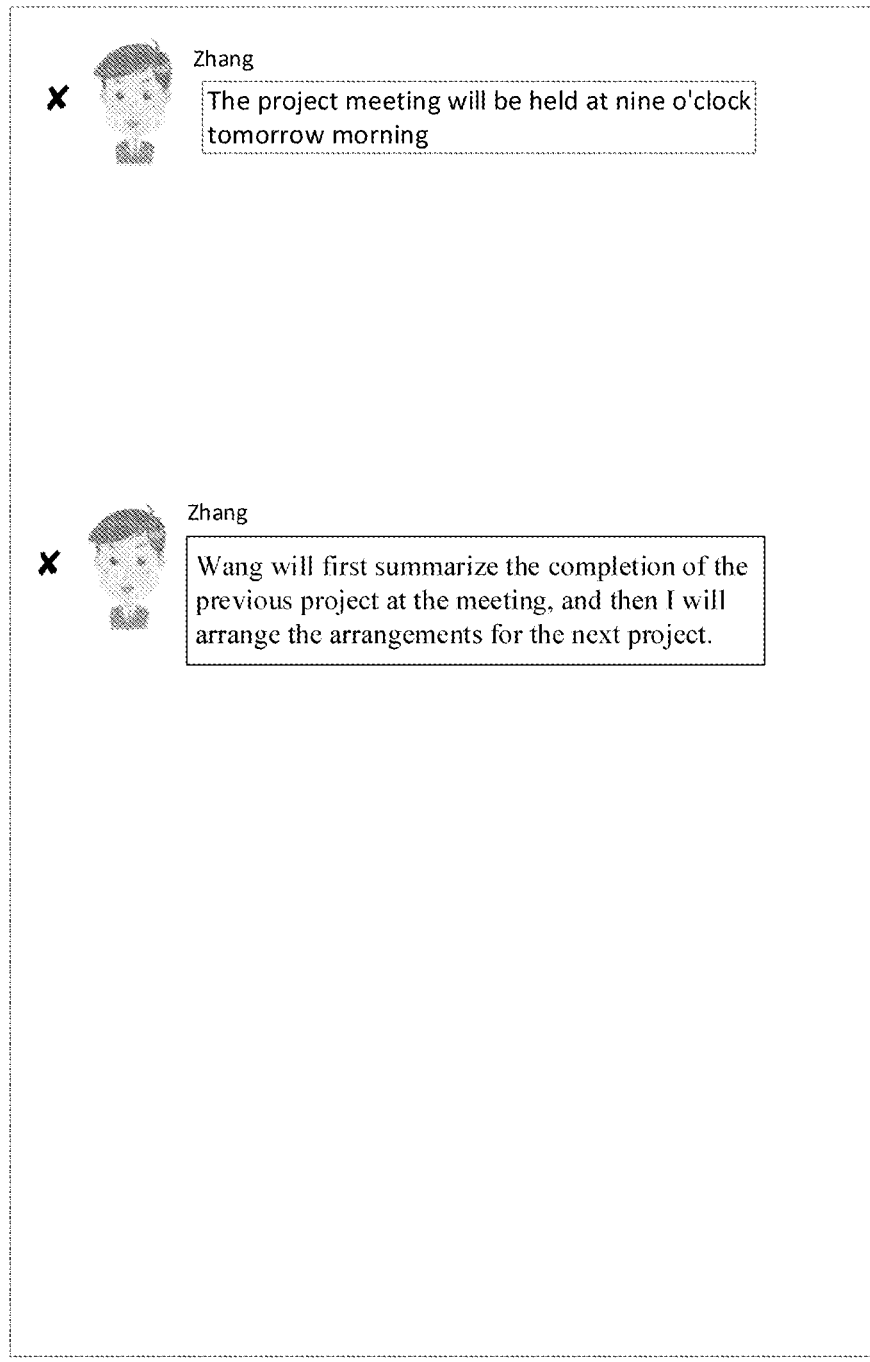
FIG. 6 schematically shows another editing interface obtained after deleting some dialogue information in the editing interface shown in FIG. 5.

As a non-limiting example, the process of editing the display content and generating the final display picture may include: first, in response to the user's click operations on the cross-shaped deletion controls corresponding to the second, third, and fifth to eighth pieces of dialogue information from top to bottom in the editing interface shown in FIG. 5, delete the second, third, and fifth to eighth pieces of dialogue information in the editing interface shown in FIG. 5, respectively, to obtain the edited editing interface as shown in FIG. 6, that is, the display content of the editing interface includes the remained original first and fourth pieces of dialogue information; then, in response to, for example, the user's click operation on the edit completion control, generate a final display picture, for example, the final display picture shown in FIG. 7 that is generated based on the display content of the edited editing interface as shown in FIG. 6.

It should be understood that the information deletion control may also adopt other manners, for example, including: a selection control displayed adjacent to the user avatar image of each piece of the dialogue information, and a deletion confirmation control displayed in the editing interface. Thus, in response to the user's click operation on the deletion confirmation control after the click operations on one or some selection controls, the dialogue information corresponding to the selection control(s) to which the click operation is applied is deleted.

It should be noted that, similar to the case that the input field, the status bar, etc. are omitted in FIG. 3, the input field, the status bar, etc. are also omitted in FIG. 5. In addition, it should also be understood that since what is included in the editing interface shown in FIG. 5 includes only the dialogue information and the information deletion controls, the editing interface shown in FIG. 5 naturally does not include an input field, a status bar and the like.

In some optional implementations, each piece of information in the information corresponding to the information interaction interface further includes a user identification. For example, the dialogue information includes the user identification and the dialogue content. Therefore, the editing interface may also include a user identification deletion control corresponding to a user identification.

Therefore, step S130 may further include: displaying in the editing interface a user identification deletion control corresponding to the user identification of the at least one piece of editable information respectively. Correspondingly, step 140 may further include: deleting all pieces of editable information having the user identification corresponding to the user identification deletion control from the editing interface in response to an operation on the user identification deletion control.

Based on this implementation, the user can conveniently and quickly delete all the dialogue information corresponding to any one or some user identifications in the editing interface through the user identification deletion control corresponding to the user identification(s), that is, all the dialogue content sent by any one or some users. Therefore, irrelevant dialogue information can be easily removed from the screenshot picture, which is helpful to improve the efficiency and convenience of information sharing by screenshots of the dialogue interface of the social application.

Figure 8:
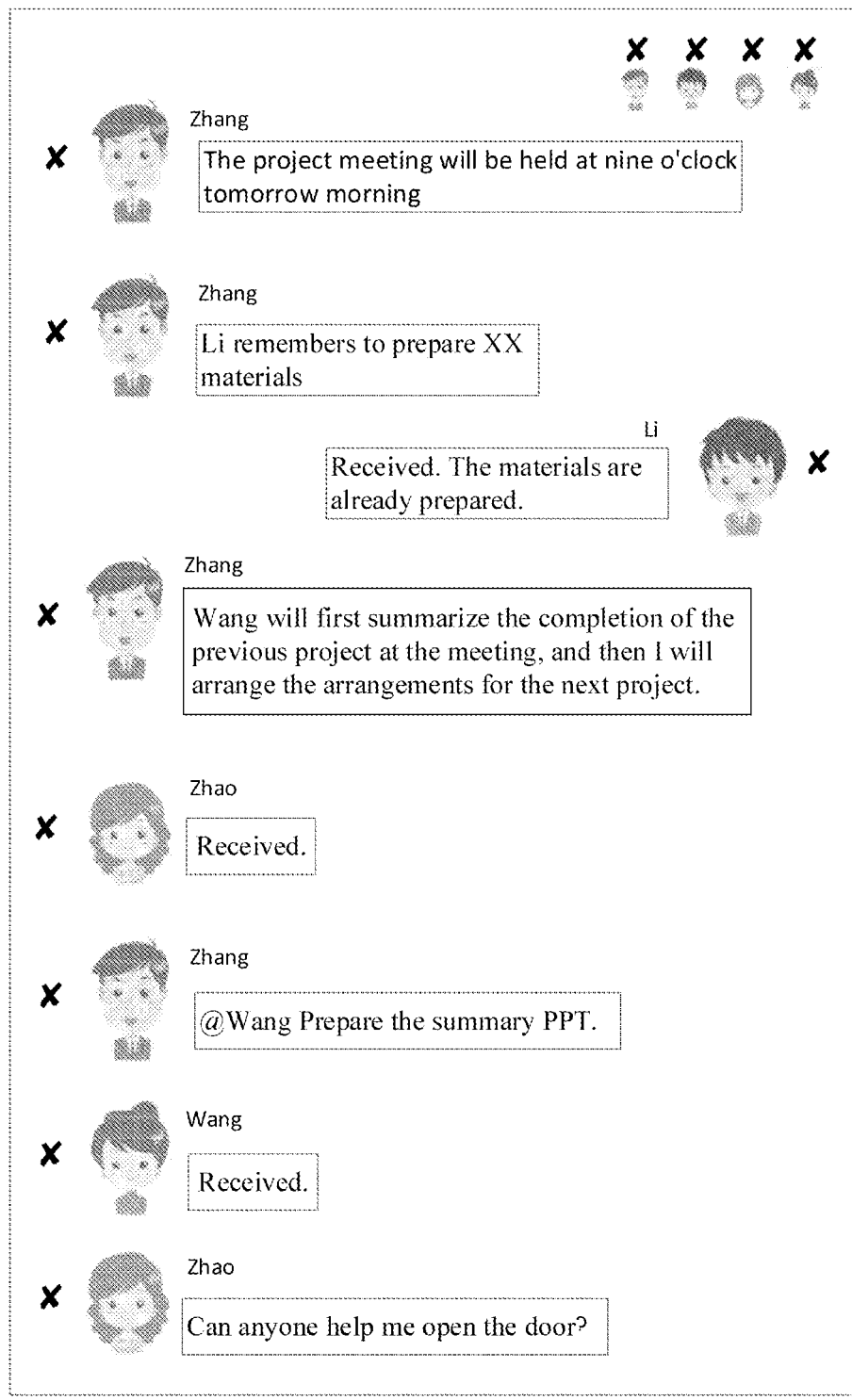
FIG. 8 schematically shows another editing interface obtained based on recognizing the screenshot picture shown in FIG. 3.
Figure 9:
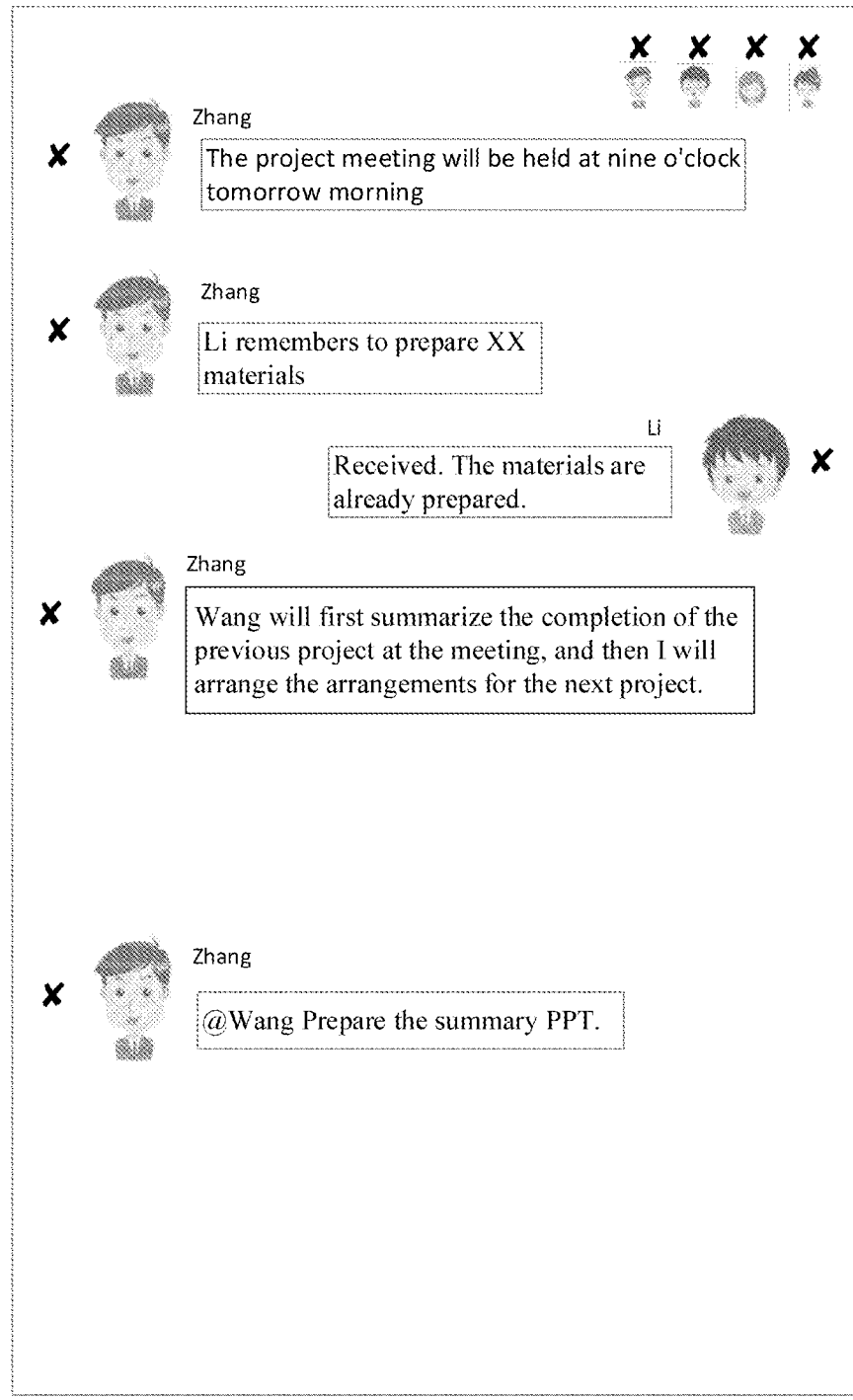
FIG. 9 schematically shows another editing interface obtained after deleting some dialogue information in the editing interface shown in FIG. 8.
Figure 10:
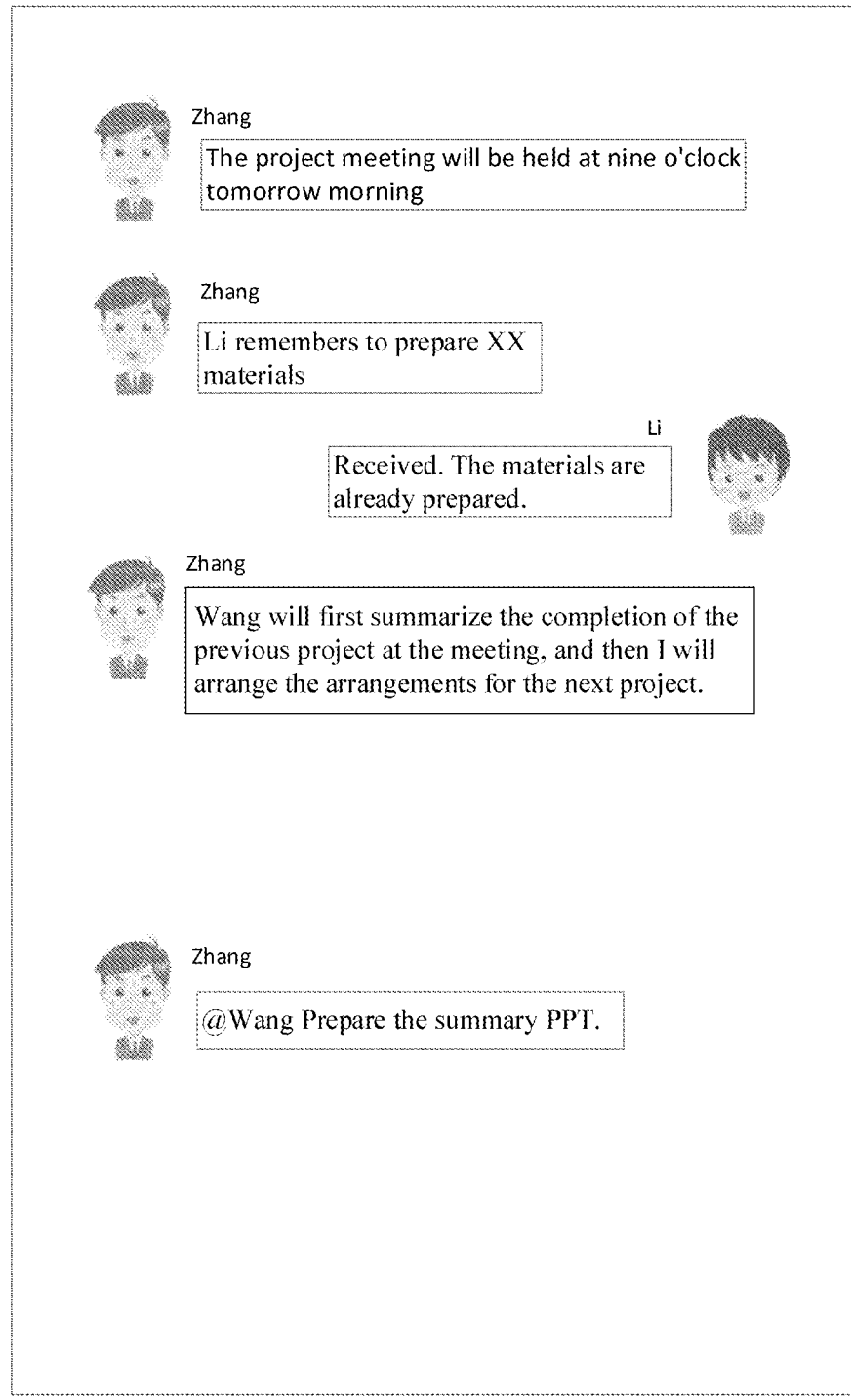
FIG. 10 is a schematic diagram showing a final display picture generated based on the editing interface shown in FIG. 9.

In an exemplary specific example, the editing interface includes the user identification deletion control(s) corresponding to each user identification of all user identifications displayed in the current dialogue interface, and the user identification deletion control corresponds to the user identification in a one-to-one correspondence. In this example, step S120 adopts the first acquisition manner (recognizing the dialogue information from the ordinary screenshot picture), and the dialogue information displayed in the current dialogue interface is acquired by recognizing the screenshot picture shown in FIG. 3. In the editing interface of this situation, the dialogue information displayed in the current dialogue interface displayed based on the display format of the current dialogue interface, the information deletion control corresponding to each piece of the dialogue information, and the user identification deletion control(s) corresponding to each user identification of all user identifications displayed in the current dialogue interface, are as shown in FIG. 8. The information deletion control and its response manner are similar to the above-mentioned specific examples, and will not be described here. The user identification deletion control is presented as a cross-shaped deletion control displayed above each user avatar image in the upper right corner of the editing interface (it should be understood that the user avatar images displayed in the upper right corner of the editing interface can also be replaced by the user names). As a non-limiting example, the process of editing the display content and generating the final display picture based on the user identification deletion control may include: first, in response to the user's click operation on the third and fourth cross-shaped deletion controls from left to right in the upper right corner of the editing interface shown in FIG. 8, delete the fifth, seventh, and eighth pieces of the dialogue information from top to bottom in the editing interface shown in FIG. 8, respectively, that is, delete Zhao and Wang and the corresponding dialogue information in the editing interface shown in FIG. 8, so the edited editing interface obtained is as shown in FIG. 9, that is, the display content of the editing interface includes the first to fourth and sixth pieces of the original dialogue information; then, in response to, for example, the user click operation on the edit completion control, the final display picture is generated, that is, the final display picture shown in FIG. 10 is generated based on the display content of the edited editing interface shown in FIG. 9.

In some alternative implementations, step S140 may further include: when deleting the editable information from the editing interface, using the undisplayed information to fill a blank area in the editing interface formed by deleting the editable information.

For the dialogue interface, after the dialogue information is deleted, the dialogue information located after the deleted dialogue information in chronological order can be used to fill the blank area formed by deleting the dialogue information in the editing interface, so as to edit the display content of the editing interface.

It should be noted that using the dialogue information located after the deleted dialogue information in chronological order to fill the blank area formed by deleting the dialogue information in the editing interface may include two filling manners: the first filling manner is to sequentially move up the display position of the first dialogue information displayed in the current dialogue interface after the deleted dialogue information to fill the blank area formed by deleting the dialogue information; the second filling manner is to sequentially display the second dialogue information that is not currently displayed and located after the first dialogue information, so as to fill the blank area formed by deleting the dialogue information and/or moving the first dialogue information. The basis of the second filling manner is that the dialogue information corresponding to the current dialogue interface acquired in step S120 includes the dialogue information displayed in the current dialogue interface and the dialogue information located after the dialogue information displayed in the current dialogue interface. For example, the second acquisition manner (recognizing the dialogue information from the extended screenshot picture) or the third acquisition manner (the manner of acquiring the dialogue information directly from the application data of the social application) is adopted to acquire the dialogue information corresponding to the current dialogue interface.

After deleting the dialogue information in the editing interface, this implementation uses the subsequent dialogue information after the deleted dialogue information to automatically fill the blank area formed by deleting dialogue information, and the subsequent dialogue information that is already displayed in the editing interface can be automatically moved forward in sequence, and subsequent dialogue information that is not displayed can be automatically displayed in sequence to fill the blank area formed by deleting dialogue information. Therefore, this implementation can realize: integrating valuable information that cannot be originally presented in a screenshot picture into a screenshot picture so as to present more valuable information with fewer screenshots. Therefore, this implementation is more conducive to integrating valuable dialogue information to be shared in the screenshot picture, and it is also more convenient for the person being shared to quickly and accurately obtain the information to be notified.

Figure 11:
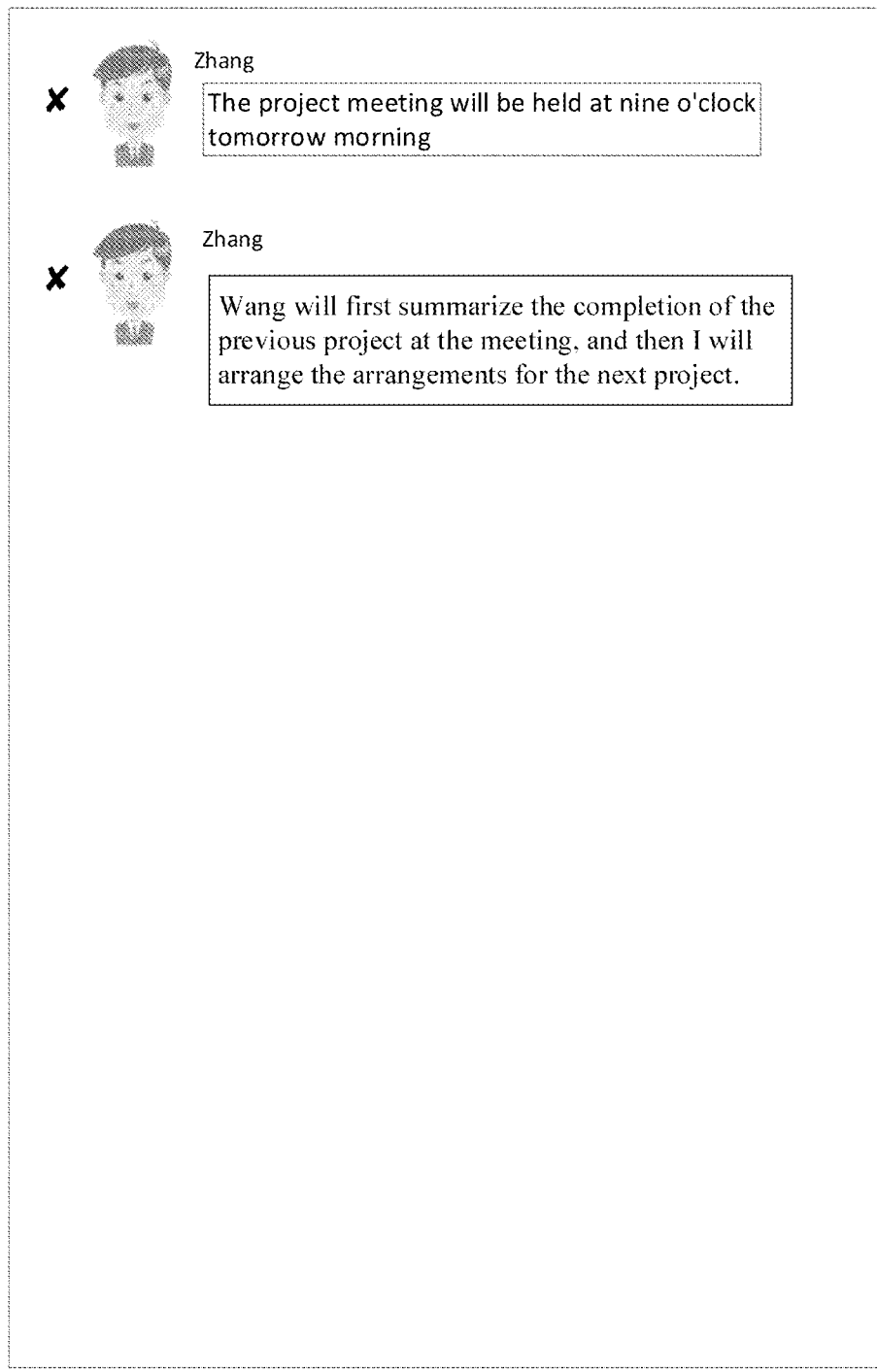
FIG. 11 schematically shows another editing interface obtained after deleting some dialogue information in the editing interface shown in FIG. 5.

In a non-limiting specific example, step S120 adopts the first acquisition manner (recognizing the dialogue information from the ordinary screenshot picture), and the dialogue information displayed in the current dialogue interface can be acquired by recognizing the screenshot picture shown in FIG. 3. In the editing interface of this situation, the dialogue information displayed in the current dialogue interface based on the display format of the current dialogue interface, and the information deletion control corresponding to each piece of dialogue information are as shown in FIG. 5, wherein the information deletion control is presented as a cross-shaped deletion control displayed adjacent to the user avatar image of each piece of the dialogue information. As a non-limiting example, the process of editing the display content and generating the picture may include: First, in response to the user's click operations on the cross-shaped deletion controls corresponding to the second, third, and fifth to eighth pieces of dialogue information from top to bottom in the editing interface shown in FIG. 5, delete the second, third, and fifth to eighth pieces of dialogue information in the editing interface shown in FIG. 5, respectively, and move the display position of the fourth piece of dialogue information upward to fill the blank area formed by deleting the second and third pieces of dialogue information. The edited editing interface is as shown in FIG. 11, that is, the display content of the editing interface includes the remained original first and fourth pieces of dialogue information, and the distance between the two pieces of dialogue information is automatically adjusted to the distance in the original display format. Then, in response to, for example, the user's click operation on the edit completion control, generate the final display picture, and the final display picture including the display content of the edited editing interface shown in FIG. 11 is as shown in FIG. 12.

Figure 13:
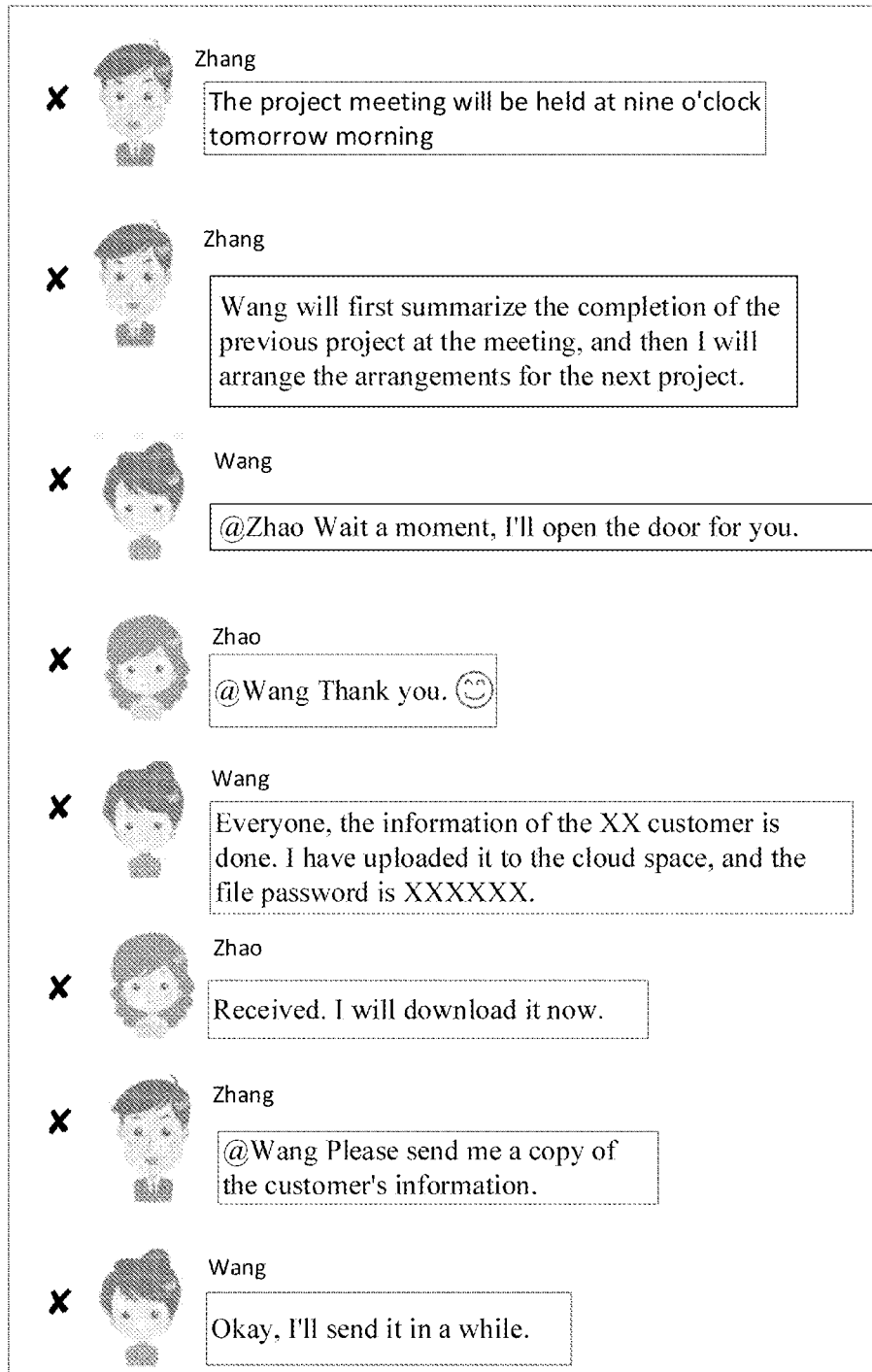
FIG. 13 schematically shows another editing interface obtained after deleting some dialogue information in the editing interface shown in FIG. 5.
Figure 14:
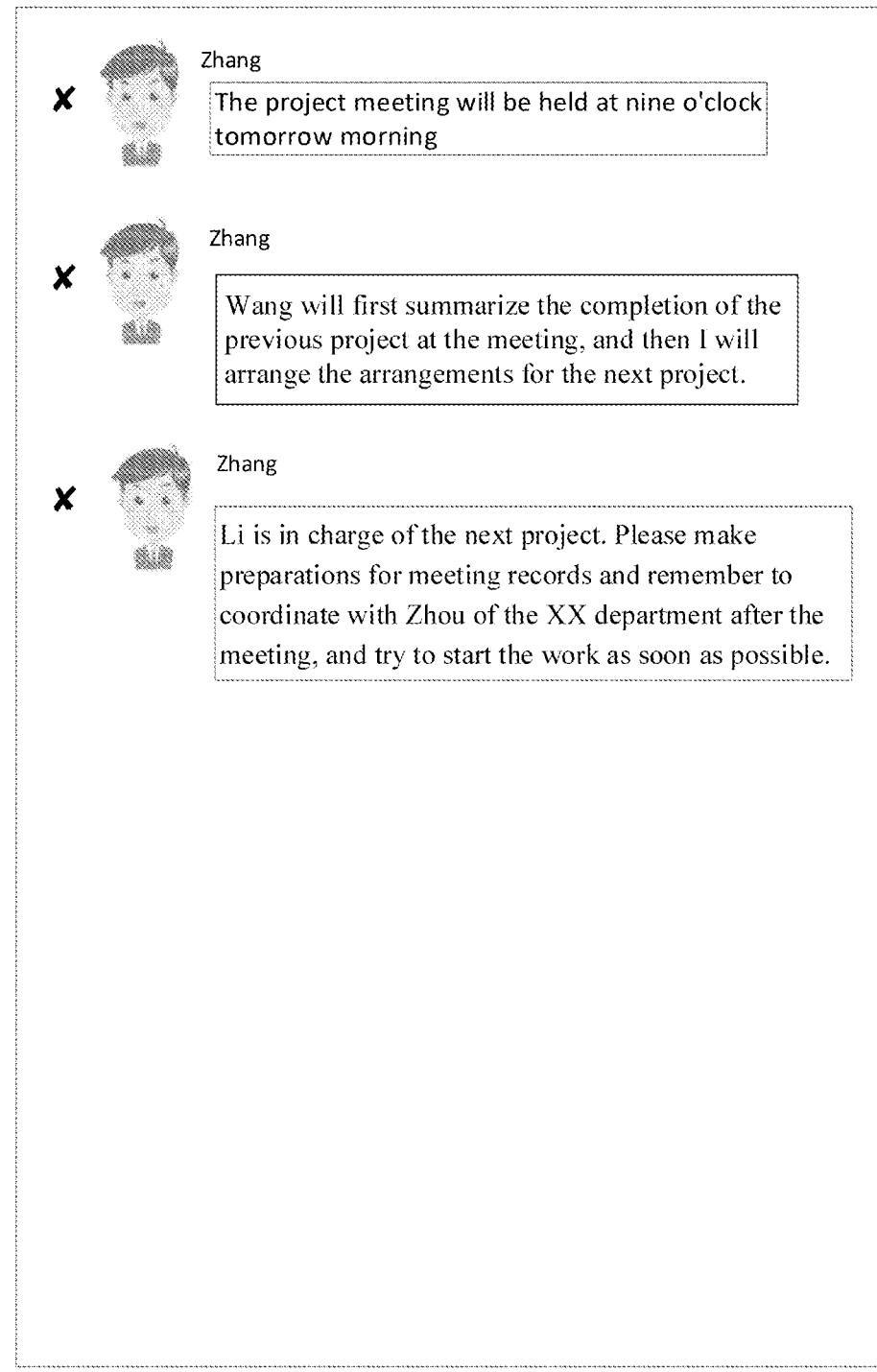
FIG. 14 schematically shows another editing interface obtained after deleting some dialogue information in the editing interface shown in FIG. 13.

In another specific example, step S120 adopts the second acquisition manner (recognizing the dialogue information from the picture of the scrolling screenshot), the dialogue information displayed in the current dialogue interface and the dialogue information located after the dialogue information displayed in the current dialogue interface in chronological order can be acquired by recognizing the extended screenshot picture shown in FIG. 4. In the editing interface of this situation, the dialogue information displayed in the current dialogue interface based on the display format of the current dialogue interface, and the information deletion control corresponding to each piece of dialogue information are as shown in FIG. 5, wherein the information deletion control is presented as a cross-shaped deletion control displayed adjacent to the user avatar image of each piece of the dialogue information. As a non-limiting example, the process of editing the display content and generating the final display picture may include: First, in response to the user's click operations on the cross-shaped deletion controls corresponding to the second, third, and fifth to eighth pieces of dialogue information from top to bottom in the editing interface shown in FIG. 5, delete the second, third, and fifth to eighth pieces of dialogue information in the editing interface shown in FIG. 5, respectively, and move the display position of the fourth piece of dialogue information upward to fill the blank area formed by deleting the second and third pieces of dialogue information, and the subsequent dialogue information recognized from the subsequent dialogue interface shown in the dashed line dialogue item box in FIG. 4 is automatically filled and displayed in the editing interface in sequence. The edited editing interface is as shown in FIG. 13. Afterwards, in response to the user's click operations on the cross-shaped deletion controls corresponding to the third to eighth pieces of dialogue information from top to bottom in the editing interface shown in FIG. 13, delete the third to eighth pieces of dialogue information in the editing interface shown in FIG. 13, respectively, and the subsequent dialogue information recognized from the subsequent dialogue interface shown in the dashed line dialogue item box in FIG. 4 is automatically filled and displayed in the editing interface in sequence. The edited editing interface is as shown in FIG. 14. Finally, in response to, for example, the user's click operation on the edit completion control, generate the final display picture, and the final display picture including the display content of the edited editing interface shown in FIG. 14 is as shown in FIG. 15.

It should be noted that the filling of the blank area after deleting the dialogue information by using the user identification deletion control is similar to the above-mentioned principles and manners of using the information deletion control to delete dialogue information, and therefore will not be repeatedly described here.

In some optional implementations, step S140 may further include: when deleting the editable information from the editing interface, adding a deletion indicator at a position where the editable information is deleted.

For a dialogue interface as a non-limiting example, a deletion indicator is added to the position where the dialogue information is deleted to edit the display content of the editing interface, so that the deletion indicator can be used to show the position where the dialogue information is deleted.

This implementation can facilitate the person being shared to know where the dialogue information has been deleted.

In this implementation, any suitable graphics can be used for the deletion indicator. As a non-limiting example, the graphics such as straight lines, zigzag lines, and asterisk lines and the like can be used.

Figure 16:
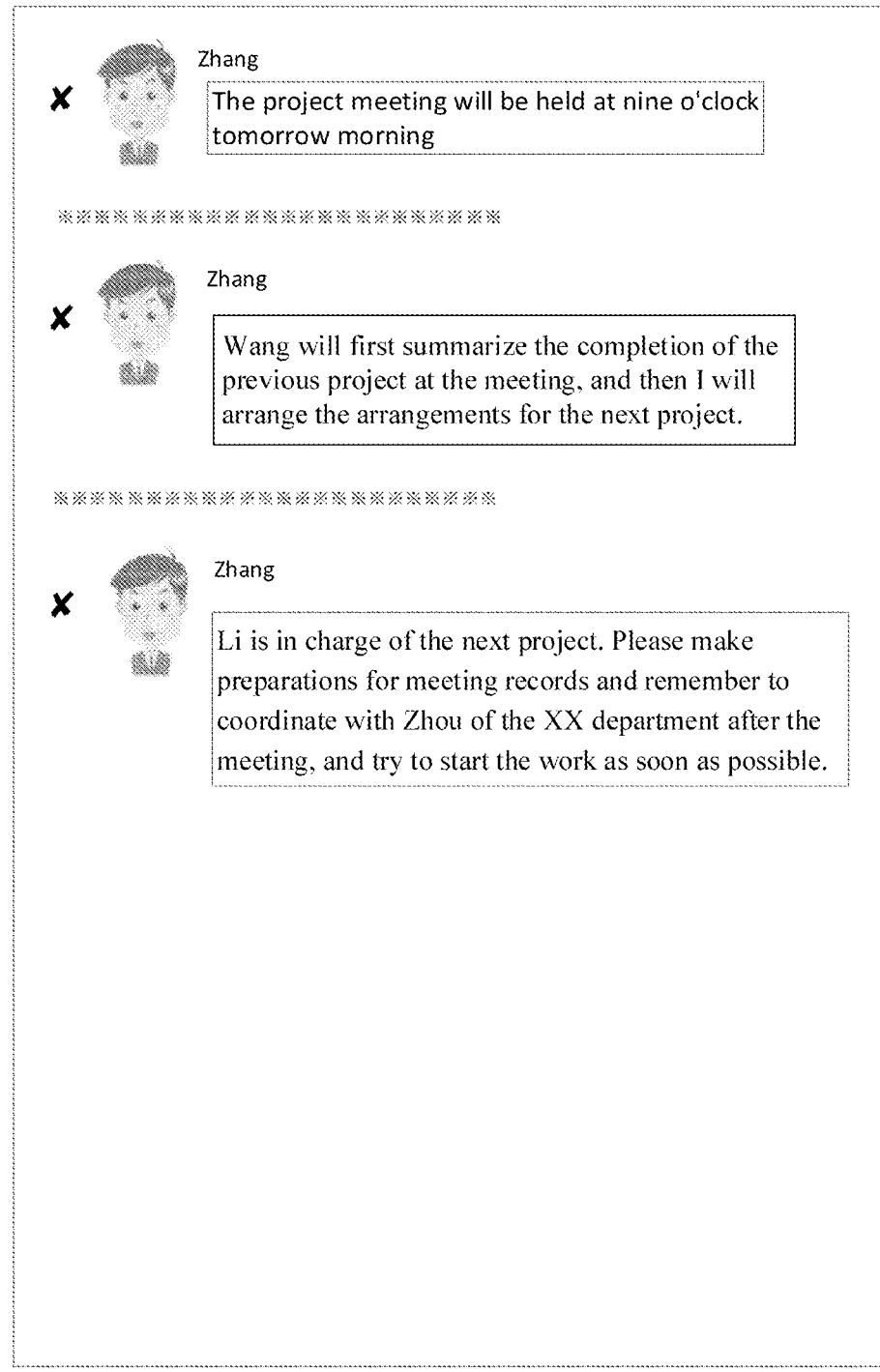
FIG. 16 schematically shows another editing interface obtained after deleting some dialogue information in the editing interface shown in FIG. 13.

Continuing the above-mentioned non-limiting specific example, after the editing of deleting the dialogue information in the editing interface shown in FIG. 13, the resulting editing interface with the deletion indicator in the form of an asterisk line is shown in FIG. 16. Then, in response to, for example, the user's click operation on the edit completion control, generate the final display picture, and the final display picture including the display content of the edited editing interface shown in FIG. 16 is as shown in FIG. 17.

In some optional implementations, the editing interface further includes an annotation addition control corresponding to each piece of the dialogue information.

In this implementation, step S130 may further include: displaying at least one annotation addition control in the editing interface, wherein each annotation addition control corresponds to a piece of editable information. Correspondingly, step 140 may further include: adding an annotation to the editable information corresponding to the annotation addition control in the editing interface in response to an operation on the annotation addition control.

It should be understood that, for the dialogue interface as a non-limiting example, in response to the operation on the annotation addition control, an annotation of the corresponding dialogue information is added in the editing interface, so as to edit the display content of the editing interface.

In some optional implementations, the editing interface may further include a display parameter modification control corresponding to each piece of the dialogue information. In this implementation, step S130 may further include: displaying at least one display parameter modification control in the editing interface, wherein each display parameter modification control corresponds to a piece of editable information. Correspondingly, step 140 further includes: modifying a display parameter of the editable information corresponding to the display parameter modification control in the editing interface in response to an operation on the display parameter modification control to change display effect of the editable information in the editing interface.

It should be understood that, for a dialogue interface, in response to an operation on the display parameter modification control, the display parameter of the corresponding dialogue information in the editing interface is modified, so as to edit the display content of the editing interface.

Based on the above implementations, the user can conveniently and quickly supplement, explain, and annotate the valuable dialogue information to be shared by means of adding an annotation to the corresponding dialogue information, which is also more convenient for the person being shared to quickly, accurately and completely obtain the information to be shared. In addition, the user can also highlight important information through bold display, differentiated font color display, and differentiated font background color display, which makes it easier for the person being shared to quickly and accurately obtain the information to be notified.

Continuing the foregoing example, adding an annotation to the dialogue information may include, for example: adding the text annotation "in the small meeting room on the second floor" to the dialogue content "The project meeting will be held at nine o'clock tomorrow morning" sent by Zhang in the editing interface shown in FIG. 14. Modifying the display parameters of the corresponding dialogue information in the editing interface, for example, may include: in the editing interface shown in FIG. 14, the dialogue content "The project meeting will be held at nine o'clock tomorrow morning" sent by Zhang is displayed in bold. The annotation addition control and the display parameter modification control can be respectively set as: in response to the user's click operations on a piece of dialogue information, display the annotation addition control, the bold control, the font color control, the background color control, and the like in the form of graphics beside the dialogue content. Thus, in response to the user's click operation on the annotation addition control, the annotation content input box is displayed in the form of a pop-up window, and in response to the annotation content input by the user in the annotation content input box, an annotation is added to the corresponding dialogue information. In response to the user's click operation on the bold control, the dialogue content of the corresponding dialogue information is displayed in bold.

Based on the above, the user can easily and quickly delete, add annotations to, highlight the dialogue information displayed in the editing interface through the editing controls such as the information deletion control, the user identification deletion control, the annotation addition control, and display parameter modification control, and the like, which is finally reflected in the picture displayed to the user. In addition, the editing interface may also include the editing controls for editing the display parameters other than dialogue information, such as the display background modification control.

In summary, according to the screenshot method provided by the exemplary embodiments of the present disclosure, when a screenshot operation is detected, the screenshot and display are not directly performed, but the following operations are performed: acquiring the dialogue information corresponding to the current dialogue interface; then, in the editing interface, displaying the acquired dialogue information corresponding to the current dialogue interface and the editing control including the information deletion control corresponding to each piece of dialogue information, in the display format that is the same as the display format of the current dialogue interface and is convenient for the user to view and operate; next, according to the operations on the editing controls such as the information deletion control, realize editing the display content such as deleting any one or some pieces of dialogue information in the editing interface; and finally, generate the final display picture according to the edited display content. Therefore, the user can quickly and easily delete the dialogue information contained in the editing interface through the editing controls such as the information deletion control, which is finally reflected in the picture displayed to the user, so as to easily remove irrelevant dialogue from the screenshot picture, remain and integrate valuable dialogue information to be shared, avoid interference or leakage of irrelevant dialogue information, and facilitate the person being shared to quickly and accurately obtain the information to be notified, without any affection to the original dialogue records in the social application. Therefore, the screenshot method provided according to the exemplary embodiments of the present disclosure effectively improves the efficiency and convenience of the information sharing by means of the screenshots of the dialogue interface of the social application, and thereby improving the user experience.

Figure 18:
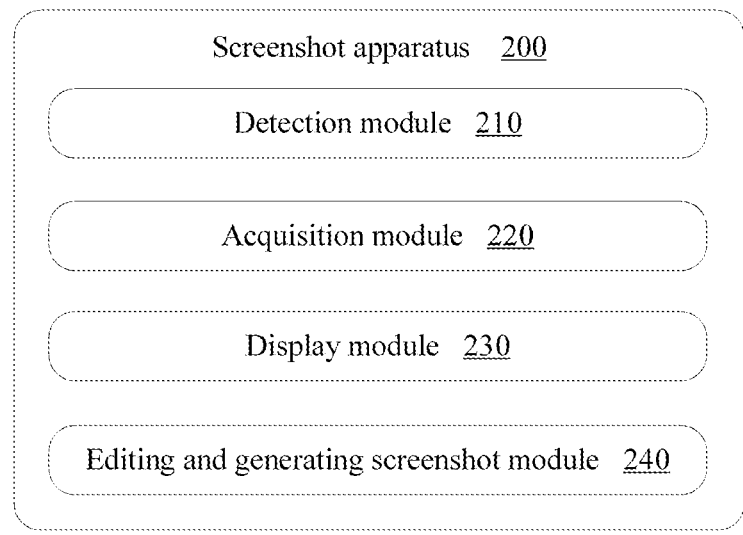
FIG. 18 is a schematic diagram showing a screenshot apparatus provided according to an exemplary embodiment of the present disclosure.

As shown in FIG. 18, another embodiment of the present disclosure provides a screenshot apparatus 200 for an information interaction interface, including: a detection module 210, an acquisition module 220, a display module 230, and an editing and generating screenshot module 240. Specifically, the detection module 210 is configured to detect a screenshot operation; the acquisition module 220 is configured to acquire information corresponding to the information interaction interface in response to the screenshot operation, wherein the information corresponding to the information interaction interface comprises at least one piece of display information currently displayed in the information interaction interface; the display module 230 is configured to display an editing interface comprising at least one piece of editable information, wherein each piece of editable information corresponds to one piece of display information; and the editing and generating screenshot module 240 is configured to edit display content of the editing interface in response to an operation on the editing interface to generate a final display picture comprising at least edited display content.

In some optional implementations, the dialogue information included in the editing interface displayed by the display module 230 may be displayed based on the display format of the current dialogue interface.

In some optional implementations, the dialogue information may include the user identification and the dialogue content.

In some optional implementations, the operation that the acquisition module 220 responds to the screenshot operation to acquire the information corresponding to the information interaction interface may further include: acquiring a screenshot picture in response to the screenshot operation; and recognizing at least one piece of display information currently displayed in the information interaction interface from the screenshot picture.

In some optional implementations, the information corresponding to the information interaction interface may also include undisplayed information that is not currently displayed in the information interaction interface. For example, for a dialogue interface as a non-limiting example, the dialogue information corresponding to the current dialogue interface may also include the dialogue information located after the dialogue information displayed in the current dialogue interface in chronological order.

In some optional implementations, the operation that the acquisition module 220 responds to the screenshot operation to acquire the information corresponding to the information interaction interface may further include: acquiring an extended screenshot picture in response to the screenshot operation and a scrolling screenshot operation associated with the screenshot operation; and recognizing at least one piece of display information currently displayed in the information interaction interface and undisplayed information not currently displayed in the information interaction interface from the extended screenshot picture.

In some optional implementations, the operation that the acquisition module 220 responds to the screenshot operation to acquire the information corresponding to the information interaction interface may further include: in response to the screenshot operation, acquiring at least one piece of display information currently displayed in the information interaction interface and undisplayed information not currently displayed in the information interaction interface from application data of an application program using the information interaction interface.

In some optional implementation, the editing interface may also include the user identification deletion control corresponding to the user identification. Therefore, the editing and generating screenshot module 240 may also be configured to delete all pieces of editable information having the user identification corresponding to the user identification deletion control from the editing interface in response to an operation on the user identification deletion control.

In some optional implementations, the editing and generating screenshot module 240 can also be configured as: when deleting the editable information from the editing interface, using the undisplayed information to fill a blank area in the editing interface formed by deleting the editable information. As a non-limiting example, for a dialogue interface as a non-limiting example, the editing and generating screenshot module 240 can also be configured as: after deleting the dialogue information, using the dialogue information located after the deleted dialogue information in chronological order to fill the blank area formed by deleting the dialogue information in the editing interface, so as to edit the display content of the editing interface.

In some optional implementations, the editing and generating screenshot module 240 can also be configured as: when deleting the editable information from the editing interface, adding a deletion indicator at a position where the editable information is deleted. For a dialogue interface as a non-limiting example, the editing and generating screenshot module 240 can also be configured to add a deletion indicator at the position where the dialogue information is deleted to edit the display content of the editing interface, wherein the deletion indicator is used to show the position where the dialogue information is deleted.

In some optional implementations, the editing interface displayed by the display module 230 may also include an annotation addition control corresponding to each piece of editable information. Therefore, the editing and generating screenshot module 240 can also be configured as: adding an annotation to the editable information corresponding to the annotation addition control in the editing interface in response to an operation on the annotation addition control, so as to edit the display content of the editing interface.

In some optional implementations, the editing interface displayed by the display module 230 further includes a display parameter modification control corresponding to each piece of editable information. Therefore, the editing and generating screenshot module 240 is also used to modify the display parameters of the corresponding editable information in the editing interface in response to the operation on the display parameter modification control, so as to edit the display content of the editing interface.

It should be noted that, according to the exemplary embodiments of the present disclosure, the principles and work flows of the various modules in the screenshot apparatus 200 for an information interaction interface are related to the corresponding steps in the screenshot methods of the respective exemplary embodiments described above in conjunction with FIG. 1 to FIG. 17, and therefore will not be repeated described here.

In addition, it should be understood that the various modules of the screenshot apparatus 200 described above with respect to FIG. 18 may be implemented in hardware or in hardware combined with software and/or firmware. For example, these modules may be implemented as computer-executable codes/instructions configured to be executed in one or more processors and stored in a computer-readable storage medium. Alternatively, these modules can be implemented as hardware logic/circuitry. For example, in some embodiments, one or more of these modules may be implemented together in a system on chip (SoC). The SoC may include an integrated circuit chip (which includes a processor (for example, a central processing unit (CPU), a microcontroller, a microprocessor, a digital signal processor (DSP), etc.), a memory, one or more communication interfaces, and/or one or more components in other circuits), and can optionally execute the received program code and/or include embedded firmware to perform functions.

Figure 19:
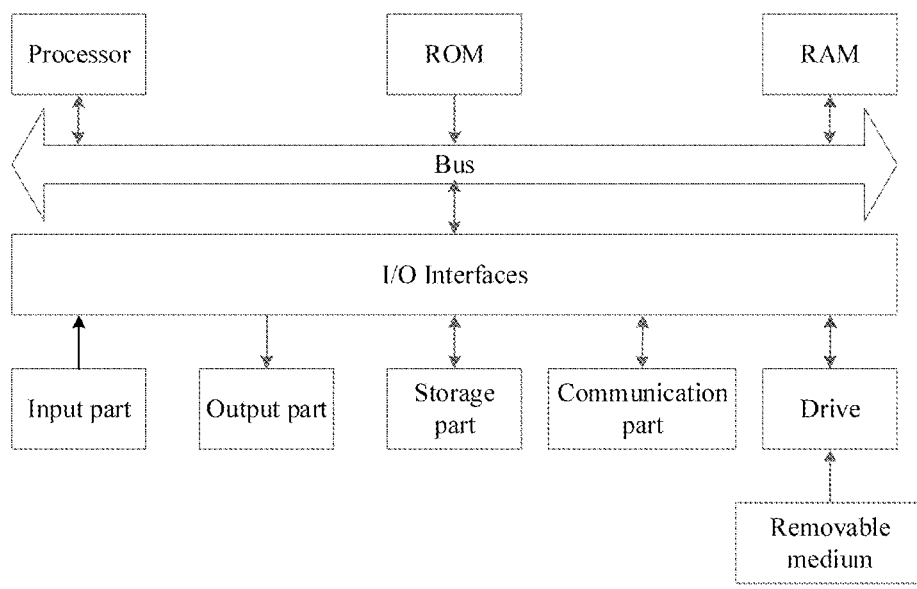
FIG. 19 is a schematic diagram showing a computing device provided according to an exemplary embodiment of the present disclosure.

As shown in FIG. 19, it schematically shows the structure of a computing device according to an exemplary embodiment of the present disclosure. The computing device may be used to implement the screenshot apparatus 200 shown in FIG. 18, and may be used to execute the screenshot method described with reference to FIGS. 1 to 17. The computing device may include a processor, which can run a program stored in a read-only memory (ROM) or a program loaded into a random access memory (RAM) from a storage part to perform various appropriate actions and processing. Various programs and data required for the operation of the computing device are also stored in the RAM. The processor may be a single processing unit or a plurality of processing units, and all processing units may include a single or a plurality of computing units or a plurality of cores. The processor can be implemented as one or more microprocessors, microcomputers, microcontrollers, digital signal processors, central processing units (CPUs), state machines, logic circuits, and/or any device that manipulates signals based on operating instructions.

The processor, ROM and RAM can be connected with each other by a bus. The input/input (I/O) interfaces can also be connected to the bus. In addition, the I/O interfaces can also be connected to the following components, including: the input part such as keyboard and mouse; the output part such as liquid crystal display (LCD) and speakers; the storage part such as hard disks; and the communication part including the network interface card such as LAN card, modem, etc.

The input part and the output part may include any suitable devices that receive various inputs from the users and provide various outputs to the users, including but not limited to a touch input device, a gesture input device, a camera, a keyboard, a remote control, a mouse, a printer, an audio input/output devices, and the like. The communication part performs communication processing via a network such as the internet. The communication part can also facilitate communication within a variety of network and protocol types, including wired networks (such as LAN, cable, etc.) and wireless networks (such as WLAN, cellular, satellite, etc.), the internet, and so on. The communication part can also provide communication with external storage devices (not shown) such as storage arrays, network-attached storage, storage area networks, and the like. In addition, a drive can also be connected to the I/O interfaces as required. As a non-limiting example, a removable storage medium, such as a magnetic disk, an optical disk, a magneto-optical disk, a semiconductor memory, etc., can be installed on the drive as needed, so that the drive can be used to read the computer program from it and load the computer program to the storage part, as needed.

It should be understood that the screenshot method provided according to each exemplary embodiment of the present disclosure may also be implemented as a computer software program. For example, a computer program product may include a computer program stored on a computer-readable storage medium, and the computer program contains program codes for executing the screenshot methods provided according to the various exemplary embodiments of the present disclosure. The computer-readable storage media include but are not limited to RAM, ROM, EEPROM, flash memory or other semiconductor storage devices, CD-ROM, digital versatile disk (DVD) or other optical storage devices, magnetic cassettes, magnetic tapes, magnetic disk storage devices or other magnetic storage devices. It should be understood that the computer-readable storage medium may be any suitable non-transitory storage medium used to store information for access by a computing device.

It should be understood that the flowcharts and schematic diagrams in the drawings illustrate the possible implementation architecture, functions, and operations of the system, method, and computer program products according to the exemplary embodiments of the present disclosure. In this regard, each block in the flowchart or schematic diagram can represent a module, program segment, or part of the codes, and the above-mentioned module, program segment or part of the codes may contain one or more executable instructions for realizing the specified logic functions. It should also be understood that, in some alternative implementations, the functions indicated in the blocks may also occur in a different order than that indicated in the drawings. For example, according to actual needs, two consecutively represented blocks may actually be executed substantially in parallel, and they may sometimes be executed in the reverse order. It should be understood that each block in the schematic diagram and/or flowchart, and the combination of the blocks in the schematic diagram and/or flowchart, can be implemented by a dedicated hardware-based system that performs the specified function or operation, or it can be realized by a combination of dedicated hardware and computer instructions.

It should be understood that the modules involved in the exemplary embodiments of the present disclosure may be implemented in software or hardware. The described module can also be provided in the processor, for example, it can be described as: a processor including a detection module, an acquisition module, and an editing module. In such a situation, the names of these modules do not constitute a restriction on the module itself under certain circumstances. For example, the detection module can also be described as a receiving module for receiving screenshot operations.

As another aspect, the exemplary embodiment of the present disclosure also provides a non-volatile computer storage medium, which may be the non-volatile computer storage medium included in the above-mentioned apparatus in the above-mentioned embodiment. The non-volatile computer storage medium may also be a non-volatile computer storage medium that exists alone and is not assembled into the terminal. The above-mentioned non-volatile computer storage medium stores one or more programs, and when the above-mentioned one or more programs are executed by a device, the above-mentioned device executes the screenshot method for the information interaction interface provided according to each exemplary embodiment of the present disclosure.

The terms used herein are only used to describe the embodiments in the present disclosure, and are not intended to limit the present disclosure. As used herein, the singular forms "a," "an," and "the" are intended to also include the plural forms, unless the context clearly states otherwise. It should also be understood that the terms "comprising" and "including", when used in the present disclosure, refer to the existence of the mentioned features, but do not exclude the existence of one or more other features or the addition of one or more other features. As used herein, the term "and/or" includes any and all combinations of one or more of the associated listed items. It should be understood that although the terms "first", "second", "third", etc. may be used herein to describe various features, these features should not be limited by these terms. These terms are only used to distinguish one feature from another.

Unless otherwise defined, all terms (including technical and scientific terms) used herein have the same meanings as commonly understood by those having ordinary skills in the art to which this disclosure belongs. It should also be understood that terms such as those defined in commonly used dictionaries should be interpreted as having meanings consistent with their meanings in the relevant field and/or the context of this specification, and will not be idealized or overly Interpreted in a formal sense, unless explicitly defined as such in this article.

In the description of this specification, the descriptions of the terms "one embodiment", "some embodiments", "examples", "specific examples", or "some examples" and the like mean the specific features, structures, materials, or characteristics described in conjunction with the embodiment or example are included in at least one embodiment or example of the present disclosure. In this specification, the schematic representations of the above-mentioned terms are not necessarily directed to the same embodiment or example. Moreover, the described specific features, structures, materials or characteristics can be combined in any one or more embodiments or examples in a suitable manner In addition, those having ordinary skills in the art can combine and assemble the different embodiments or examples as well as the features of the different embodiments or examples described in this specification without contradicting each other.

The present disclosure describes various techniques in the general context of software, hardware elements or program modules. Generally, these modules include routines, programs, objects, elements, components, data structures, etc. that perform specific tasks or implement specific abstract data types. The terms "module", "function" and "component" used herein generally refer to software, firmware, hardware, or a combination thereof. The features of the technologies described in the present disclosure are platform-independent, which means that these technologies can be implemented on various computing platforms with various processors.

It should be understood that the various parts of the present disclosure can be implemented by hardware, software, firmware, or a combination thereof. In the above embodiments, a plurality of steps or methods can be implemented by software or firmware stored in a memory and executed by a suitable instruction execution system. For example, if it is implemented by hardware, it can be implemented by any one of or a combination of the following technologies known in the art: discrete logic circuits with logic gates for realizing logic functions for data signals, application specific integrated circuits with suitable combinational logic gates, programmable gate arrays, field programmable gate arrays, etc.

Those having ordinary skills in the art can understand that all or part of the steps of the above-mentioned embodiment methods can be completed by a program instruction relevant hardware. The program can be stored in a computer-readable storage medium. When the program is executed, it includes one of the steps of the method embodiment or a combination thereof.

Although the present disclosure has been described in detail in connection with some exemplary embodiments, it is not intended to be limited to the specific forms set forth herein. Instead, the scope of the present disclosure is limited only by the appended claims.

What is claimed is:

1. A screenshot method for a dialogue interface, comprising the following steps:
   detecting a screenshot operation;
   acquiring information corresponding to the dialogue interface in response to the screenshot operation, wherein the information corresponding to the dialogue interface comprises at least one piece of displayed dialogue information currently displayed in the dialogue interface;
   displaying an editing interface comprising at least one piece of editable information, wherein each piece of editable information corresponds to one piece of displayed dialogue information, each piece of displayed dialogue information comprises a user identification with a piece of corresponding editable information comprising an identical user identification;
   displaying in the editing interface at least one user identification deletion control, wherein each user identification deletion control respectively corresponds to one user identification;
   editing display content of the editing interface in response to an operation on the editing interface to generate a final display picture comprising at least edited display content, wherein, in response to an operation on a user identification deletion control, all pieces of editable information having a user identification identical to that corresponding to the user identification deletion control are deleted from the editing interface.

2. The screenshot method according to claim 1, wherein a display format of the at least one piece of editable information in the editing interface is the same as a display format of the at least one piece of displayed dialogue information in the dialogue interface.

3. The screenshot method according to claim 1, wherein the step of displaying an editing interface comprising at least one piece of editable information further comprises:
   displaying at least one information deletion control in the editing interface, wherein each information deletion control corresponds to a piece of editable information.

4. The screenshot method according to claim 3, wherein the step of editing display content of the editing interface in response to an operation on the editing interface to generate a final display picture comprising at least edited display content further comprises:
   deleting the piece of editable information corresponding to the information deletion control from the editing interface in response to an operation on the information deletion control.

5. The screenshot method according to claim 1, wherein the information corresponding to the dialogue interface further comprises undisplayed dialogue information that is not currently displayed in the dialogue interface.

6. The screenshot method according to claim 5, wherein the step of editing display content of the editing interface in response to an operation on the editing interface to generate a final display picture comprising at least edited display content further comprises:
   when deleting the editable information from the editing interface, using the undisplayed dialogue information to fill a blank area in the editing interface formed by deleting the editable information.

7. The screenshot method according to claim 1, wherein the step of editing display content of the editing interface in response to an operation on the editing interface to generate a final display picture comprising at least edited display content further comprises:

when deleting the editable information from the editing interface, adding a deletion indicator at a position where the editable information is deleted.

8. The screenshot method according to claim 1, wherein the step of displaying an editing interface comprising at least one piece of editable information further comprises:
displaying at least one annotation addition control in the editing interface, wherein each annotation addition control corresponds to a piece of editable information.

9. The screenshot method according to claim 8, wherein the step of editing display content of the editing interface in response to an operation on the editing interface to generate a final display picture comprising at least edited display content further comprises:
adding an annotation to the editable information corresponding to the annotation addition control in the editing interface in response to an operation on the annotation addition control.

10. The screenshot method according to claim 1, wherein the step of displaying an editing interface comprising at least one piece of editable information further comprises:
displaying at least one display parameter modification control in the editing interface, wherein each display parameter modification control corresponds to a piece of editable information.

11. The screenshot method according to claim 10, wherein the step of editing display content of the editing interface in response to an operation on the editing interface to generate a final display picture comprising at least edited display content further comprises:
modifying a display parameter of the editable information corresponding to the display parameter modification control in the editing interface in response to an operation on the display parameter modification control to change display effect of the editable information in the editing interface.

12. The screenshot method according to claim 1, wherein the step of acquiring information corresponding to the dialogue interface in response to the screenshot operation further comprises:
acquiring a screenshot picture in response to the screenshot operation;
recognizing at least one piece of displayed dialogue information currently displayed in the dialogue interface from the screenshot picture.

13. The screenshot method according to claim 5, wherein the step of acquiring information corresponding to the dialogue interface in response to the screenshot operation further comprises:
acquiring an extended screenshot picture in response to the screenshot operation and a scrolling screenshot operation associated with the screenshot operation;
recognizing at least one piece of displayed dialogue information currently displayed in the dialogue interface and at least one piece of undisplayed dialogue information not currently displayed in the dialogue interface from the extended screenshot picture.

14. The screenshot method according to claim 5, wherein the step of acquiring information corresponding to the dialogue interface in response to the screenshot operation further comprises:
in response to the screenshot operation, acquiring at least one piece of displayed dialogue information currently displayed in the dialogue interface and at least one piece of undisplayed dialogue information not currently displayed in the dialogue interface from application data of an application program using the ndialogue interface.

15. A screenshot apparatus for a dialogue interface, comprising:
a detection module configured to detect a screenshot operation;
an acquisition module configured to acquire information corresponding to the dialogue interface in response to the screenshot operation, wherein the information corresponding to the dialogue interface comprises at least one piece of displayed dialogue information currently displayed in the dialogue interface;
a display screen configured to display an editing interface comprising at least one piece of editable information, wherein each piece of editable information corresponds to one piece of displayed dialogue information, each piece of displayed dialogue information comprises a user identification with a piece of corresponding editable information comprising an identical user identification, and wherein the dispaly is also configured to display in the editing interface at least one user identification deletion control with each user identification deletion control respectively corresponding to one user identification;
an editing and generating screenshot module configured to edit display content of the editing interface in response to an operation on the editing interface to generate a final display picture comprising at least edited display content, wherein, in response to an operation on a user identification deletion control, all pieces of editable information having a user identification identical to that corresponding to the user identification deletion control are deleted from the editing interface.

16. A computing device comprising a processor and a memory, the memory being configured to store computer-executable instructions, the computer-executable instructions being configured to, when executed on the processor, make the processor perform the screenshot method for a dialogue interface according to claim 1.

17. A non-transitory computer-readable storage medium configured to store computer-executable instructions, the computer-executable instructions being configured to, when executed on a processor, make the processor perform the screenshot method for a dialogue interface according to claim 1.

* * * * *